US011900913B2

(12) United States Patent
Watanabe et al.

(10) Patent No.: US 11,900,913 B2
(45) **Date of Patent: *Feb. 13, 2024**

(54) SOUND SIGNAL PROCESSING METHOD AND SOUND SIGNAL PROCESSING DEVICE

(71) Applicant: YAMAHA CORPORATION, Hamamatsu (JP)

(72) Inventors: Takayuki Watanabe, Hamamatsu (JP); Dai Hashimoto, Hamamatsu (JP)

(73) Assignee: YAMAHA CORPORATION, Hamamatsu (JP)

( * ) Notice: Subject to any disclaimer, the term of this patent is extended or adjusted under 35 U.S.C. 154(b) by 0 days.

This patent is subject to a terminal disclaimer.

(21) Appl. No.: 17/946,327

(22) Filed: Sep. 16, 2022

(65) Prior Publication Data

US 2023/0018435 A1 Jan. 19, 2023

Related U.S. Application Data

(63) Continuation of application No. 17/166,226, filed on Feb. 3, 2021, now Pat. No. 11,482,206.

(30) Foreign Application Priority Data

Feb. 19, 2020 (JP) ................................ 2020-025817

(51) Int. Cl.
*H04R 3/00* (2006.01)
*G10K 15/10* (2006.01)
(Continued)

(52) U.S. Cl.
CPC ............ *G10K 15/10* (2013.01); *H04R 1/403* (2013.01); *H04R 1/406* (2013.01); *H04R 3/005* (2013.01);
(Continued)

(58) Field of Classification Search
CPC ........ H04R 1/403; H04R 1/406; H04R 3/005; H04R 3/12
(Continued)

(56) References Cited

U.S. PATENT DOCUMENTS

| | | | |
|---|---|---|---|
| 3,535,453 | A | 10/1970 | Veneklasen |
| 5,119,428 | A | 6/1992 | Prinssen |

(Continued)

FOREIGN PATENT DOCUMENTS

| | | | |
|---|---|---|---|
| CN | 101933242 | A | 12/2010 |
| EP | 0386846 | A1 | 9/1990 |

(Continued)

OTHER PUBLICATIONS

Extended European Search Report issued in European Appln. No. 21154956.3 dated Jul. 2, 2021.

(Continued)

*Primary Examiner* — Disler Paul
(74) *Attorney, Agent, or Firm* — ROSSI, KIMMS & McDOWELL LLP

(57) ABSTRACT

A sound signal processing method includes: obtaining a plurality of sound signals respectively collected by a plurality of microphones arranged in a space; adjusting respective levels of the plurality of sound signals in accordance with respective positions of the plurality of microphones; mixing the plurality of sound signals having the adjusted respective levels to thereby obtain a mixed signal; and generating a reflected sound by using the obtained mixed signal.

15 Claims, 19 Drawing Sheets

(51) Int. Cl.
*H04R 1/40* (2006.01)
*H04R 3/12* (2006.01)
*H04R 29/00* (2006.01)

(52) U.S. Cl.
CPC ............. *H04R 3/12* (2013.01); *H04R 29/002* (2013.01); *H04R 2430/01* (2013.01)

(58) Field of Classification Search
USPC .................................... 381/61, 63, 93, 56, 92
See application file for complete search history.

(56) References Cited

U.S. PATENT DOCUMENTS

| | | | | |
|---|---|---|---|---|
| 5,642,425 | A | 6/1997 | Kawakami | |
| 10,685,641 | B2 * | 6/2020 | Asada | H04R 5/033 |
| 10,777,214 | B1 * | 9/2020 | Shi | H04R 29/001 |
| 10,873,800 | B1 * | 12/2020 | Khaleghimeybodi | H04S 7/304 |
| 10,893,363 | B2 * | 1/2021 | Choisel | H04R 29/002 |
| 10,986,461 | B2 | 4/2021 | Johnson | |
| 11,037,544 | B2 * | 6/2021 | Asada | H04S 7/306 |
| 11,153,685 | B2 * | 10/2021 | Toguri | G10L 25/51 |
| 11,483,651 | B2 * | 10/2022 | Rämö | G10L 21/0208 |
| 11,521,591 | B2 * | 12/2022 | Leppanen | H04S 7/306 |
| 11,743,671 | B2 * | 8/2023 | Satou | H04S 1/007 381/303 |
| 2010/0119075 | A1 * | 5/2010 | Xiang | H04S 7/30 381/63 |
| 2018/0308503 | A1 | 10/2018 | Kaskari | |
| 2019/0116450 | A1 | 4/2019 | Tsingos | |
| 2020/0107121 | A1 | 4/2020 | Choisel | |

FOREIGN PATENT DOCUMENTS

| | | | |
|---|---|---|---|
| JP | H06284493 | A | 10/1994 |
| JP | H07222297 | A | 8/1995 |
| JP | 2003216165 | A | 7/2003 |
| JP | 2015128208 | A | 7/2015 |
| WO | 2018193162 | A2 | 10/2018 |

OTHER PUBLICATIONS

Office Action issued in Russian Appln. No. 2021104065 dated Nov. 3, 2021. English translation provided.
Office Action issued in U.S. Appl. No. 17/166,226 dated Dec. 27, 2021.
Office Action issued in U.S. Appl. No. 17/166,226 dated Mar. 30, 2022.
Notice of Allowance issued in U.S. Appl. No. 17/166,226 dated Jun. 28, 2022.
Office Action issued in Chinese Appln. No. 202110177050.7 dated May 25, 2022. English machine translation provided.
Office Action issued in Chinese Appln. No. 202110177050.7 dated Oct. 19, 2022. English machine translation provided.
Office Action issued in European Appln. No. 21154956.3 dated Apr. 5, 2023.
Office Action issued in Japanese Appln. No. 2020-025817 dated Oct. 31, 2023. English translation provided.

* cited by examiner

SOUND SIGNAL PROCESSING METHOD AND SOUND SIGNAL PROCESSING DEVICE

CROSS REFERENCE TO RELATED APPLICATIONS

This Nonprovisional application claims priority under 35 U.S.C. § 119(a) on Patent Application No. 2020-025817 filed in Japan on Feb. 19, 2020, the entire contents of which are hereby incorporated by reference.

BACKGROUND

Technical Field

One embodiment of the present disclosure relates to a sound signal processing method and a sound signal processing device which process an obtained sound signal.

Background Information

In facilities such as concert halls, various genres of music are played, and speeches such as lectures are given. Such facilities require various acoustic characteristics (e.g., reverberation characteristics). For example, a relatively long reverberation is required in a performance, and a relatively short reverberation is required in a speech.

However, physically changing the reverberation characteristics in the hall has required a change in the size of the space by, for example, moving the ceiling, and has required a very large facility.

Therefore, for example, a sound field control device as disclosed in Japanese Unexamined Patent Publication No. 6-284493 processes a sound, obtained by a microphone, with a finite impulse response (FIR) filter to generate a reverberant sound and outputs the reverberant sound from a speaker disposed in a hall to support a sound field.

SUMMARY

However, just adding reverberant sound blurs the sense of localization. Recently, it has been desired to realize a richer sound image and more spatial expansion.

Therefore, it is an object of one embodiment of the present disclosure to provide a sound signal processing method and a sound signal processing device that perform sound image localization in accordance with the position of a sound source in a space, thereby realizing a richer sound image and spatial expansion.

A sound signal processing method includes: obtaining a plurality of sound signals respectively collected by a plurality of microphones arranged in a space; adjusting respective levels of the plurality of sound signals in accordance with respective positions of the plurality of microphones; mixing the plurality of sound signals having the adjusted respective levels to thereby obtain a mixed signal; and generating a reflected sound by using the obtained mixed signal.

The sound signal processing method can realize sound image localization corresponding to the position of the sound source in the space.

DETAILED DESCRIPTION

First Embodiment

Figure 1:
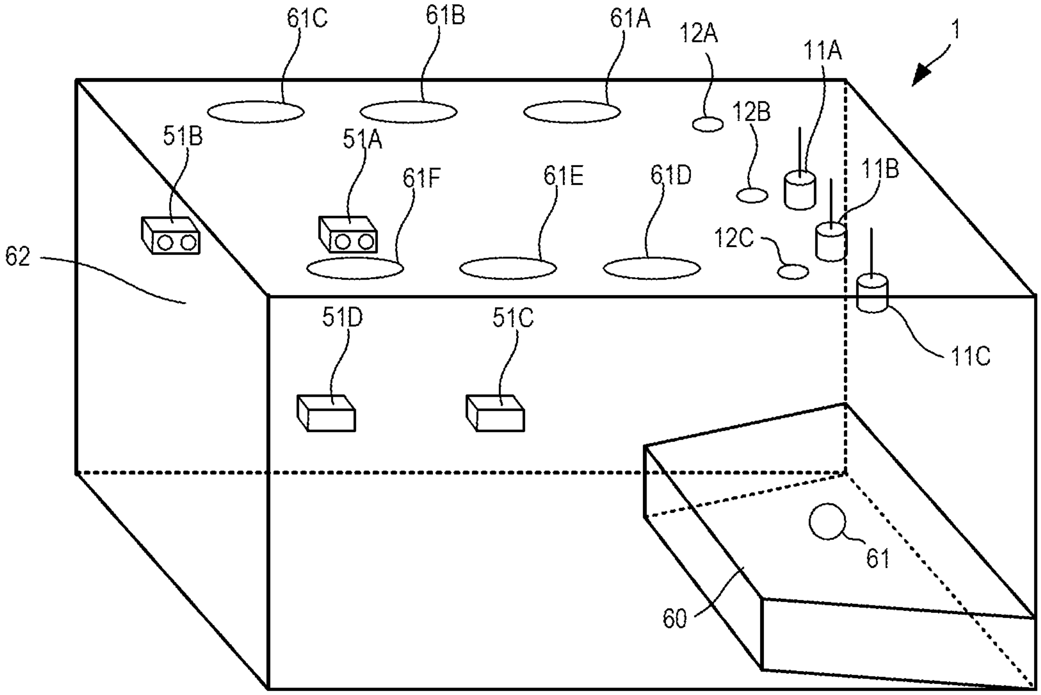
FIG. 1 is a perspective view schematically showing a space of a first embodiment.
Figure 2:
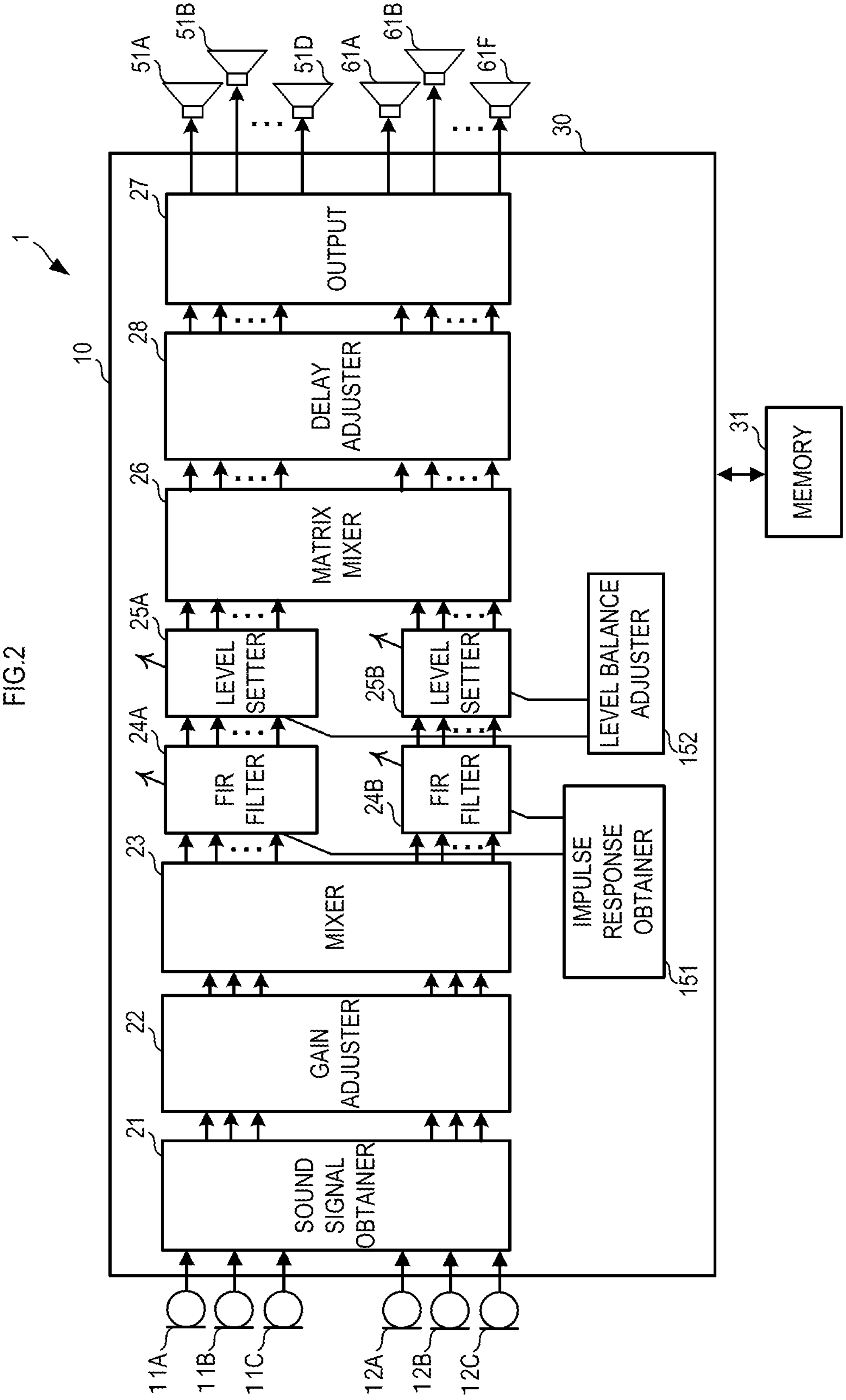
FIG. 2 is a block diagram showing a configuration of a sound field support system of the first embodiment.

FIG. 1 is a perspective view schematically showing a room 62 constituting a space. FIG. 2 is a block diagram showing a configuration of a sound field support system 1.

The room 62 constitutes a generally rectangular parallelepiped space. A sound source 61 exists on a front stage 60 in the room 62. The rear of the room 62 corresponds to audience seats where listeners sit. Note that the shape of the room 62, the placement of the sound source or the like are not limited to the example shown in FIG. 1. A sound signal processing method and a sound signal processing device of the present disclosure can provide a desired sound field regardless of the shape of the space and can realize a richer sound image and more spatial expansion than before.

The sound field support system 1 includes, in the room 62, a directional microphone 11A, a directional microphone 11B, a directional microphone 11C, an omnidirectional microphone 12A, an omnidirectional microphone 12B, an omnidirectional microphone 12C, a speaker 51A, a speaker 51B, a speaker 51C, a speaker 51D, a speaker 61A, a speaker 61B, a speaker 61C, a speaker 61D, a speaker 61E, and a speaker 61F.

The speaker 61A, the speaker 61B, the speaker 61C, the speaker 61D, the speaker 61E, and the speaker 61F correspond to a first speaker that outputs a reverberant sound control signal. The speaker 51A, the speaker 51B, the speaker 51C, and the speaker 51D correspond to a second speaker that outputs an early reflected sound control signal.

The number of directional microphones and the number of omnidirectional microphones shown in FIG. 1 are three, respectively. However, the sound field support system 1 only need be provided with at least one microphone. The number of speakers is not limited to the number shown in FIG. 1. The sound field support system 1 only need be provided with at least one speaker.

The directional microphone 11A, the directional microphone 11B, and the directional microphone 11C mainly collect the sound of the sound source 61 on the stage.

The omnidirectional microphone 12A, the omnidirectional microphone 12B, and the omnidirectional microphone 12C are disposed on a ceiling. The omnidirectional microphone 12A, the omnidirectional microphone 12B, and the omnidirectional microphone 12C collect the whole sound in the room 62 including the direct sound of the sound source 61, the reflected sound in the room 62, and the like.

The speaker 51A, the speaker 51B, the speaker 51C, and the speaker 51D are disposed on the wall surface of the room 62. The speaker 61A, the speaker 61B, the speaker 61C, the speaker 61D, the speaker 61E, and the speaker 61F are disposed on the ceiling of the room 62. However, in the present disclosure, the disposal positions of the microphones and the speakers are not limited to this example.

In FIG. 2, in addition to the configuration shown in FIG. 1, the sound field support system 1 includes a sound signal processor 10 and a memory 31. The sound signal processor 10 is mainly made up of a central processing unit (CPU) and a digital signal processor (DSP). The sound signal processor 10 functionally includes a sound signal obtainer 21, a gain adjuster 22, a mixer 23, a finite impulse response (FIR) filter 24A, an FIR filter 24B, a level setter 25A, a level setter 25B, a matrix mixer 26, a delay adjuster 28, an output 27, an impulse response obtainer 151, and a level balance adjuster 152. The sound signal processor 10 is an example of the sound signal processing device of the present disclosure.

A CPU constituting the sound signal processor 10 reads out an operation program stored in the memory 31 and controls each configuration. The CPU functionally constitutes the impulse response obtainer 151 and the level balance adjuster 152 by the operation program. Note that the operation program need not be stored in the memory 31. For example, the CPU may download an operation program from a server (not shown) each time.

Figure 3:
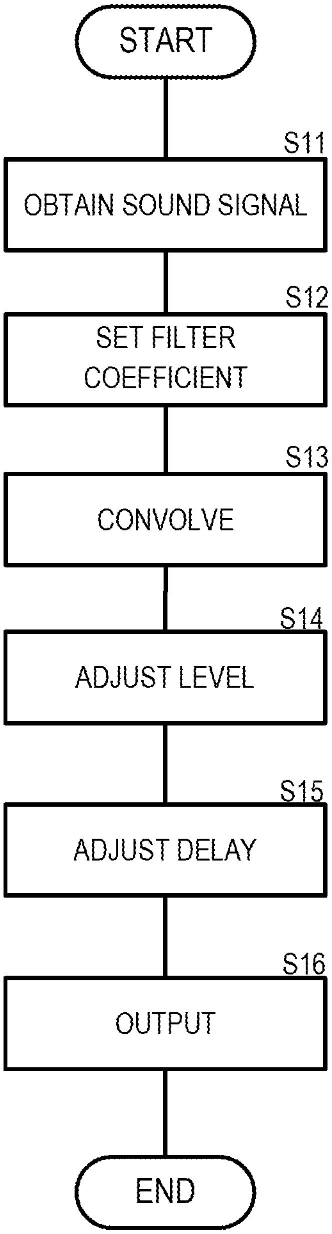
FIG. 3 is a flowchart showing an operation of a sound signal processing device.

FIG. 3 is a flowchart showing the operation of the sound signal processor 10. First, the sound signal obtainer 21 obtains a sound signal (S11). The sound signal obtainer 21 obtains sound signals from the directional microphone 11A, the directional microphone 11B, the directional microphone 11C, the omnidirectional microphone 12A, the omnidirectional microphone 12B, and the omnidirectional microphone 12C. When obtaining an analog signal, the sound signal obtainer 21 converts the analog signal into a digital signal and outputs the digital signal.

The gain adjuster 22 adjusts the gains of the sound signals obtained from the directional microphone 11A, the directional microphone 11B, the directional microphone 11C, the omnidirectional microphone 12A, the omnidirectional microphone 12B, and the omnidirectional microphone 12C through the sound signal obtainer 21. The gain adjuster 22 sets the gain of a directional microphone at a position near a sound source 61 to be higher, for example. Note that the gain adjuster 22 is not an essential configuration in the first embodiment.

The mixer 23 mixes sound signals obtained from the directional microphone 11A, the directional microphone 11B, and the directional microphone 11C. The mixer 23 distributes the mixed sound signal to a plurality of signal processing routes. The mixer 23 outputs the distributed sound signal to the FIR filter 24A. The mixer 23 mixes the sound signals obtained from the omnidirectional microphone 12A, the omnidirectional microphone 12B, and the omnidirectional microphone 12C. The mixer 23 outputs the mixed sound signal to the FIR filter 24B.

In the example of FIG. 2, the mixer 23 mixes the sound signals obtained from the directional microphone 11A, the directional microphone 11B, and the directional microphone 11C into four signal processing routes in accordance with the speaker 51A, the speaker 51B, the speaker 51C, and the speaker 51D. Also, the mixer 23 mixes the sound signals obtained from the omnidirectional microphone 12A, the omnidirectional microphone 12B, and the omnidirectional microphone 12C into four signal processing routes. The four signal processing routes correspond to speakers 61A to 61F. Hereinafter, the four signal processing routes corresponding to the speakers 61A to 61F will be referred to as a first route. The four signal processing routes corresponding to the speaker 51A, the speaker 51B, the speaker 51C, and the speaker 51D will be referred to as a second route.

Note that the number of signal processing routes is not limited to this example. The sound signals obtained from the omnidirectional microphone 12A, the omnidirectional microphone 12B, and the omnidirectional microphone 12C may be distributed to six first routes in accordance with the speaker 61A, the speaker 61B, the speaker 61C, the speaker 61D, the speaker 61E, and the speaker 61F. Note that the mixer 23 is not an essential configuration in the first embodiment.

Note that the mixer 23 may have a function of an electronic microphone rotator (EMR). The EMR is a technique for flattening frequency characteristics of a feedback loop by changing a transfer function between a fixed microphone and speaker over time. The EMR is a function for switching the relation of connection between the microphone and the signal processing route from time to time. The mixer 23 switches the output destinations of the sound signals obtained from the directional microphone 11A, the directional microphone 11B, and the directional microphone 11C and outputs the sound signals to the FIR filter 24A. Alternatively, the mixer 23 switches the output destinations of the sound signals obtained from the omnidirectional microphone 12A, the omnidirectional microphone 12B, and the omnidirectional microphone 12C and outputs the sound signals to the FIR filter 24B. Thus, the mixer 23 can flatten frequency characteristics of an acoustic feedback system from the speaker to the microphone in the room 62.

Next, the impulse response obtainer 151 sets the respective filter coefficients of the FIR filter 24A and the FIR filter 24B (S12)

Figure 4A:
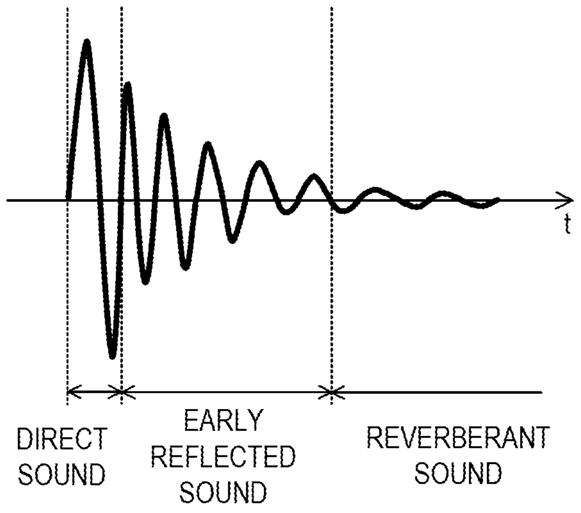
FIG. 4A is a schematic diagram showing a classification example of sound types in a temporal waveform of an impulse response used for a filter coefficient.
Figure 4B:
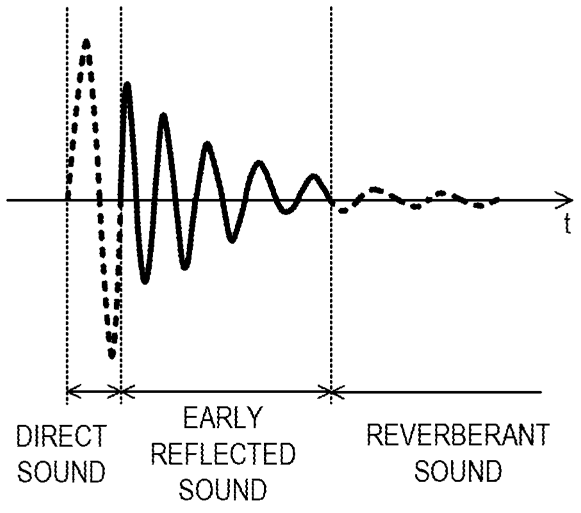
FIG. 4B is a schematic diagram showing a temporal waveform of a filter coefficient set in an FIR filter 24A.
Figure 5A:
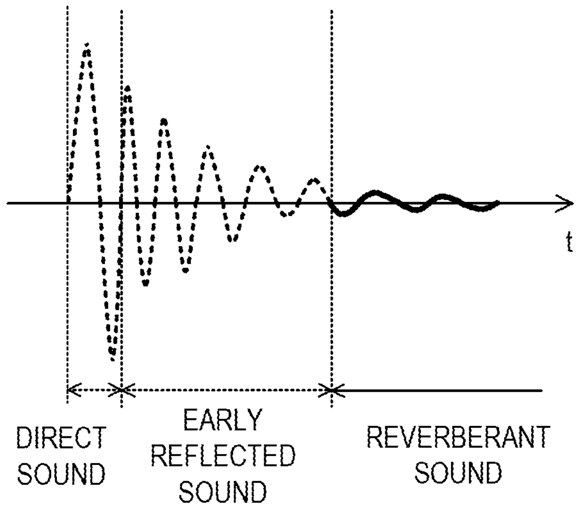
FIG. 5A is a schematic diagram showing a temporal waveform of a filter coefficient set in an FIR filter 24B.
Figure 5B:
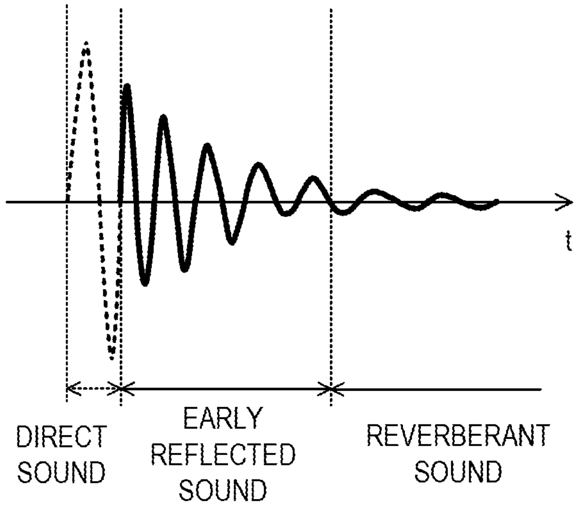
FIG. 5B is a schematic diagram showing the temporal waveform of the filter coefficient set in the FIR filter 24B.

Here, impulse response data to be set in the filter coefficient will be described. FIG. 4A is a schematic diagram showing an example of classification of sound types in a temporal waveform of an impulse response used for the filter coefficient, and FIG. 4B is a schematic diagram showing the temporal waveform of the filter coefficient set in the FIR filter 24A. FIGS. 5A and 5B are schematic diagrams each showing the temporal waveform of the filter coefficient set in the FIR filter 24B.

As shown in FIG. 4A, the impulse response can be distinguished into a direct sound, early reflected sound, and a reverberant sound arranged on a temporal axis. As shown in FIG. 4B, the filter coefficient set in the FIR filter 24A is set by the portion of the early reflected sound excluding the direct sound and the reverberant sound in the impulse response. As shown in FIG. 5A, the filter coefficient set in the FIR filter 24B is set by the reverberant sound excluding the direct sound and the early reflected sound in the impulse response. As shown in FIG. 5B, the FIR filter 24B may be set by the early reflected sound and the reverberant sound excluding a direct sound in an impulse response.

The impulse response data is stored in the memory 31. An impulse response obtainer 151 obtains the impulse response data from the memory 31. However, the impulse response data need not be stored in the memory 31. The impulse response obtainer 151 may download impulse response data from a server (not shown) or the like each time.

The impulse response obtainer 151 may obtain impulse response data obtained by cutting out only the early reflected sound in advance and set the data in the FIR filter 24A. Alternatively, the impulse response obtainer 151 may obtain impulse response data including a direct sound, an early reflected sound, and a reverberant sound, cut out only the early reflected sound, and set the data in the FIR filter 24A. Similarly, in a case where only the reverberant sound is used, the impulse response obtainer 151 may obtain impulse response data obtained by cutting out only the reverberant sound in advance and set the data in the FIR filter 24B. Alternatively, the impulse response obtainer 151 may obtain impulse response data including a direct sound, an early reflected sound, and a reverberant sound, cut out only the reverberant sound, and set the data in the FIR filter 24B.

Figure 6:
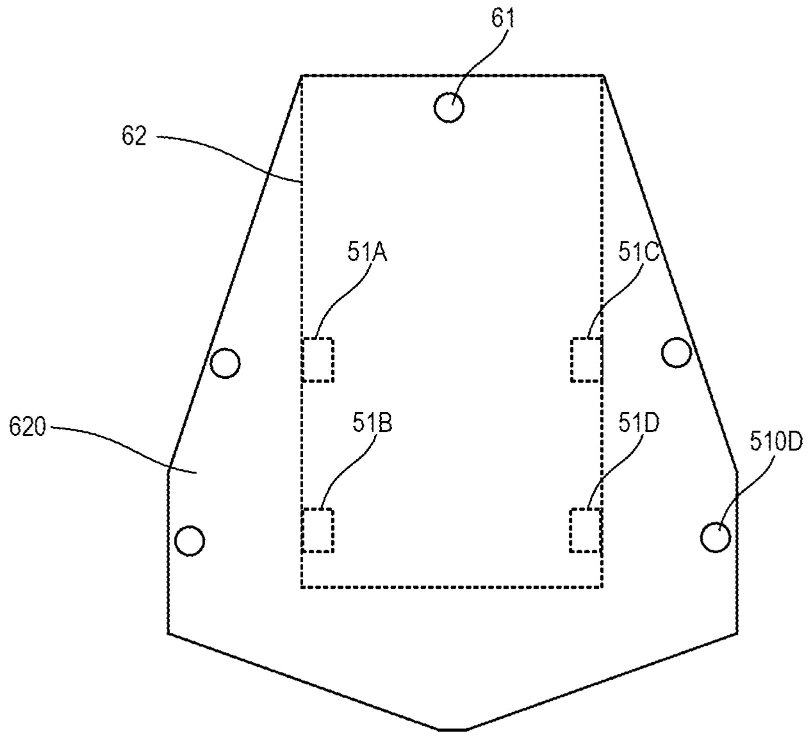
FIG. 6 is a plan view schematically showing a relationship between a space 620 and a room 62.

FIG. 6 is a plan view schematically showing the relationship between a space 620 and the room 62. As shown in FIG. 6, the impulse response data is measured in advance in a predetermined space 620, such as a concert hall or church, which is a target for reproducing the sound field. For example, the impulse response data is measured by generating a test sound (pulse sound) at the position of the sound source 61 and collecting the sound with a microphone.

The impulse response data may be obtained at any position in space 620. However, it is preferable to measure the impulse response data of the early reflected sound by using a directional microphone disposed near the wall surface. The early reflected sound is a clear reflected sound in an arrival direction. Thus, by measuring the impulse response data with the directional microphone disposed near the wall surface, the reflected sound data of the target space can be obtained precisely. On the other hand, the reverberant sound is a reflected sound in an unsettled arrival direction of sound. Therefore, the impulse response data of the reverberant sound may be measured by the directional microphone disposed near the wall surface or may be measured by an omnidirectional microphone different from the microphone for the early reflected sound.

The FIR filter 24A convolves different pieces of impulse response data into the four sound signals of the second route, which is the upper signal stream of FIG. 2. When there are a plurality of signal processing routes, the FIR filters 24A, 24B may be provided for each signal processing route. For example, the FIR filter 24A may include four filters.

As described above, when the directional microphones disposed near the wall surface are used, the impulse response data is measured by a different directional microphone for each signal processing route. For example, as shown in FIG. 6, with respect to the signal processing route corresponding to the speaker 51D disposed to the rear right of the stage 60, the impulse response data is measured by a directional microphone 510D disposed near the wall surface to the rear right of the stage 60.

The FIR filter 24A convolves the impulse response data into each sound signal of the second route (S13). The FIR filter 24B convolves the impulse response data into each sound signal of the first route, which is the lower signal stream of FIG. 2 (S13).

The FIR filter 24A convolves the input sound signal into the impulse response data of the set early reflected sound to generate an early reflected sound control signal that is the reproduction of the early reflected sound in a predetermined space. The FIR filter 24B convolves the impulse response data of the set reverberant sound into the input sound signal to generate a reverberant sound control signal that is the reproduction of the reverberant sound in a predetermined space.

The level setter 25A adjusts the level of the early reflected sound control signal (S14). The level setter 25B adjusts the level of the reverberant sound control signal (S14).

The level balance adjuster 152 sets level adjustment amounts for the level setter 25A and the level setter 25B.

The level balance adjuster 152 refers to the respective levels of the early reflected sound control signal and the reverberant sound control signal to adjust the level balance therebetween. For example, the level balance adjuster 152 adjusts the balance between the level of the temporally last component of the early reflected sound control signal and the level of the temporally first component of the reverberant sound control signal. Alternatively, the level balance adjuster 152 may adjust the balance between the power of a plurality of components that are the temporally latter half of the early reflected sound control signal and the power of a component that is the temporally earlier half of the reverberant sound control signal. Thereby, the level balance adjuster 152 can individually control the sounds of the early reflected sound control signal and the reverberant sound control signal and can control the sounds to an appropriate balance in accordance with the space to be applied.

Next, the matrix mixer 26 distributes the sound signal having been input to an output route for each speaker. The matrix mixer 26 distributes the reverberant sound control signal of the first route to each of the output routes of the speakers 61A to 61F and outputs the signal to the delay adjuster 28. With the second route already corresponding to the output route, the matrix mixer 26 outputs the early reflected sound control signal of the second route as it is to the delay adjuster 28.

Note that the matrix mixer 26 may perform gain adjustment, frequency characteristic adjustment, and the like of each output route.

The delay adjuster 28 adjusts a delay time in accordance with the distance between the sound source 61 and each of the plurality of speakers (S15). For example, the delay adjuster 28 sets the delay time to be smaller in ascending order of the distance between the sound source 61 and the speaker in each of the plurality of speakers. Thus, the delay adjuster 28 can adjust the phases of the reverberant sound control signal and the early reflected sound control signal output from each of the plurality of speakers in accordance with the positions of the plurality of speakers from the sound source 61.

The output 27 converts the early reflected sound control signal and the reverberant sound control signal output from the delay adjuster 28 into analog signals. The output 27 amplifies the analog signal. The output 27 outputs the amplified analog signal to the corresponding speaker (S16).

With the above configuration, the sound signal processor 10 obtains a sound signal, obtains impulse responses, convolves an impulse response of an early reflected sound among the impulse responses into the sound signal, and outputs the sound signal having the impulse response of the early reflected sound convolved therein as an early reflected sound control signal subjected to processing different from processing for a reverberant sound control signal. As a result, the sound signal processor 10 realizes a richer sound image and more spatial expansion than before.

In the first embodiment, for example, the following configurations can be adopted, and the following operation and effect can be obtained in each configuration.

(1-1) One embodiment of the present disclosure is a signal processing method including: obtaining a sound signal; obtaining impulse response data; and generating an early reflected sound control signal by convolving impulse response data of an early reflected sound among the obtained impulse response data into the obtained sound signal.

Figure 7:
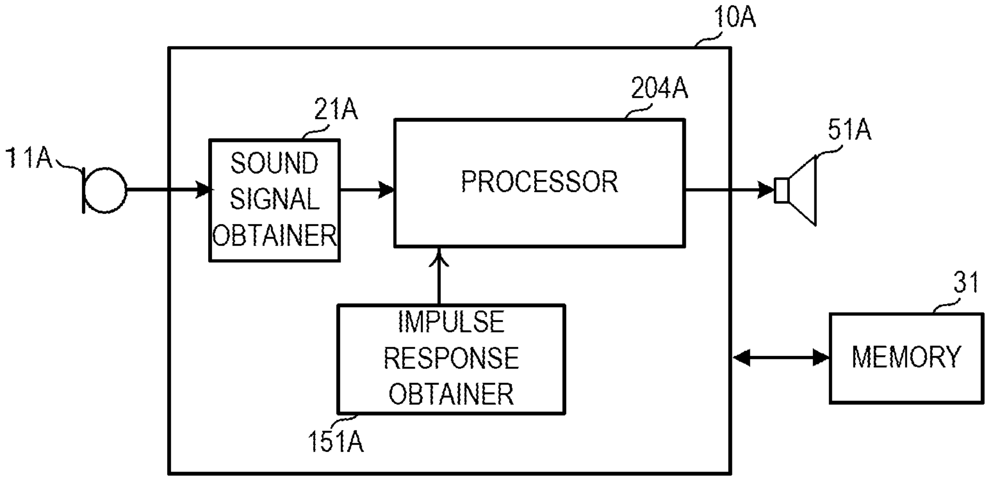
FIG. 7 is a block diagram showing the minimum configuration of the sound field support system.

FIG. 7 is a block diagram showing a configuration of a sound signal processor 10A corresponding to the signal processing method. The sound signal processor 10A includes: a sound signal obtainer 21A that obtains a sound signal from the directional microphone 11A; an impulse response obtainer 151A that obtains impulse responses; and a processor 204A that convolves an impulse response of an early reflected sound among the impulse responses into the sound signal and outputs to the speaker 51A the sound signal having the impulse response of the early reflected sound convolved therein as an early reflected sound control signal subjected to processing different from processing for a reverberant sound control signal.

The sound signal obtainer 21A has the same function as the sound signal obtainer 21 shown in FIG. 2. The impulse response obtainer 151A has the same function as the impulse response obtainer 151 of FIG. 2. The processor 204A has the functions of the FIR filter 24A and the output 27 shown in FIG. 2.

The sound signal processor 10A realizes a richer sound image and more spatial expansion than before, similarly to the sound signal processor 10 of FIG. 2.

(1-2) The processor may generate a reverberation control signal not including a direct sound by convolving impulse response data of a reverberant sound among the obtained impulse response data into the obtained sound signal, perform first signal processing on the early reflected sound control signal, perform second signal processing different from the first signal processing on the reverberation control signal, output the reverberation control signal having undergone the second signal processing to the first speaker (the speaker of the first route described above), and output the early reflected sound control signal having undergone the first signal processing to the second speaker (the speaker of the second route described above).

However, the actual room is provided with a larger number of speakers than in the example shown in FIG. 1. Among the second speakers (the speakers of the second route described above) that output the early reflected sound control signals, a speaker disposed near the first speaker (the speaker of the first route described above) may output the reverberant sound control signal. That is, among the plurality of speakers of the second route, the speaker disposed near the speaker of the first route may output the reverberant sound control signal in addition to the early reflected sound control signal.

On the other hand, among the first speakers (the speakers of the first route described above), the speaker disposed near the wall surface may output the early reflected sound control signal. That is, among the plurality of speakers of the first route, a speaker disposed near the speaker of the second route may output the early reflected sound control signal in addition to the reverberant sound control signal.

Thus, the sound of the early reflected sound control signal and the reverberant sound control signal can be adjusted with an appropriate energy balance.

(1-3) The first speaker may have a wide directivity, and the second speaker may have a narrow directivity.

As described above, the early reflected sound is a reflected sound in a clear arrival direction and contributes to a subjective impression. Therefore, it is effective to use the narrow directivity of the second speaker, and the controllability of the early reflected sound in the target space can be enhanced.

On the other hand, the reverberant sound is a reflected sound in an unsettled arrival direction of sound and contributes to sound vibrations in the space. Hence, it is effective to use the wide directivity of the first speaker, and the controllability of the reverberant sound in the target space can be enhanced.

(1-4) The level per second speaker is preferably higher than the level per first speaker.

Similarly to the above, the number of reflections of the early reflected sound is smaller than that of the reverberant sound multiply-reflected in the space. Hence, the energy of the early reflected sound is higher than the energy of the reverberant sound. Therefore, increasing the level per second speaker can improve the effect of the subjective impression of the early reflected sound and enhance the controllability of the early reflected sound.

(1-5) The number of second speakers is preferably smaller than that of the first speakers.

Similarly to the above, by reducing the number of second speakers, an increase in excess diffused sound energy can be prevented. That is, the early reflected sound output from the second speaker can be prevented from diffusing into the room and reverberating, and the reverberant sound of the early reflected sound can be prevented from reaching the listener.

(1-6) It is preferable that the first speaker be disposed on the ceiling of the room, and the second speaker be disposed on the side of the room.

The second speaker is disposed on the side of the room, which is a position close to the listener, so that the delivery of the early reflected sound to the listener is easily controlled, and the controllability of the early reflected sound can be enhanced. The first speaker is disposed on the ceiling of the room, so that the difference of the reverberant sound depending on the position of the listener can be reduced.

(1-7) The processor preferably adjusts a level balance between the early reflected sound control signal and the reverberant sound control signal.

By individually adjusting the level balance, the processor can adjust the sounds of the early reflected sound control signal and the reverberant sound control signal with an appropriate energy balance.

(1-8) It is preferable that the sound signal obtainer separately obtains a first sound signal used to generate the reverberant sound control signal and a second sound signal used to generate the early reflected sound control signal. The first sound signal is a sound signal corresponding to the first route described above (a sound signal obtained from each of the omnidirectional microphone 12A, the omnidirectional microphone 12B, and the omnidirectional microphone 12C), and the second sound signal is a sound signal corresponding to the second route described above (a sound signals obtained from each of the directional microphone 11A, the directional microphone 11B, and the directional microphone 11C).

The reverberant sound is sensitive to sound vibrations in the room. The early reflected sound is sensitive to the sound of the sound source. Therefore, it is preferable that the first sound signal collect the whole sound in the room, for example, and the second sound signal collect the sound of the sound source at a high signal-to-noise (S/N) ratio.

(1-9) It is preferable that the first sound signal be collected by the omnidirectional microphone, and the second sound signal be collected by the directional microphone.

Similarly to the above, the first sound signal preferably collects the whole sound in the room by using, for example, the omnidirectional microphone. The second sound signal preferably collects the sound of the sound source at a high S/N ratio by using, for example, the directional microphone.

(1-10) A distance from the directional microphone to a sound source of the first and second sound signals is less than a distance from the omnidirectional microphone to the sound source of the first and second sound signals.

Similarly to the above, since the second sound signal preferably collects the sound of the sound source at a high S/N ratio, the directional microphone is preferably close to the sound source.

(1-11) The impulse response data is preferably obtained by using the directional microphone disposed on or alongside a wall of the predetermined space.

The impulse response is measured by the directional microphone disposed near the wall surface, so that the reflected sound in the target space can be obtained with higher accuracy.

Second Embodiment

Figure 8:
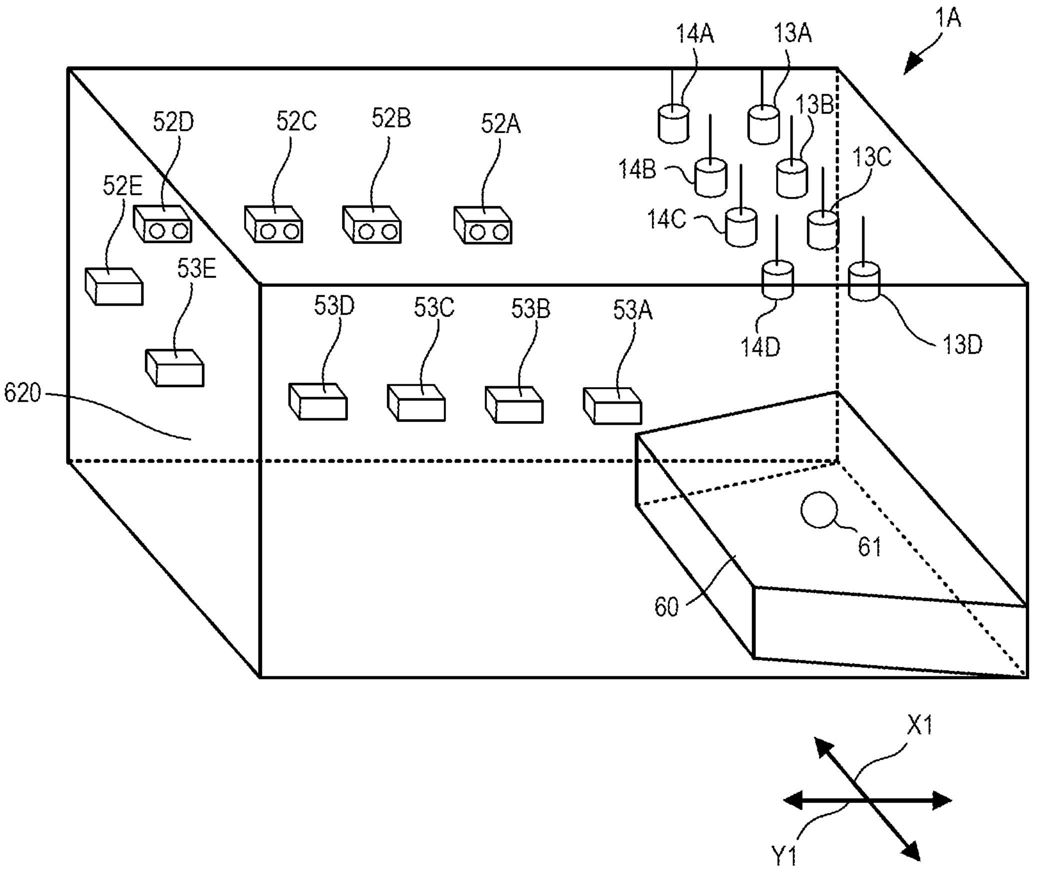
FIG. 8 is a perspective view schematically showing a space of a second embodiment.
Figure 9:
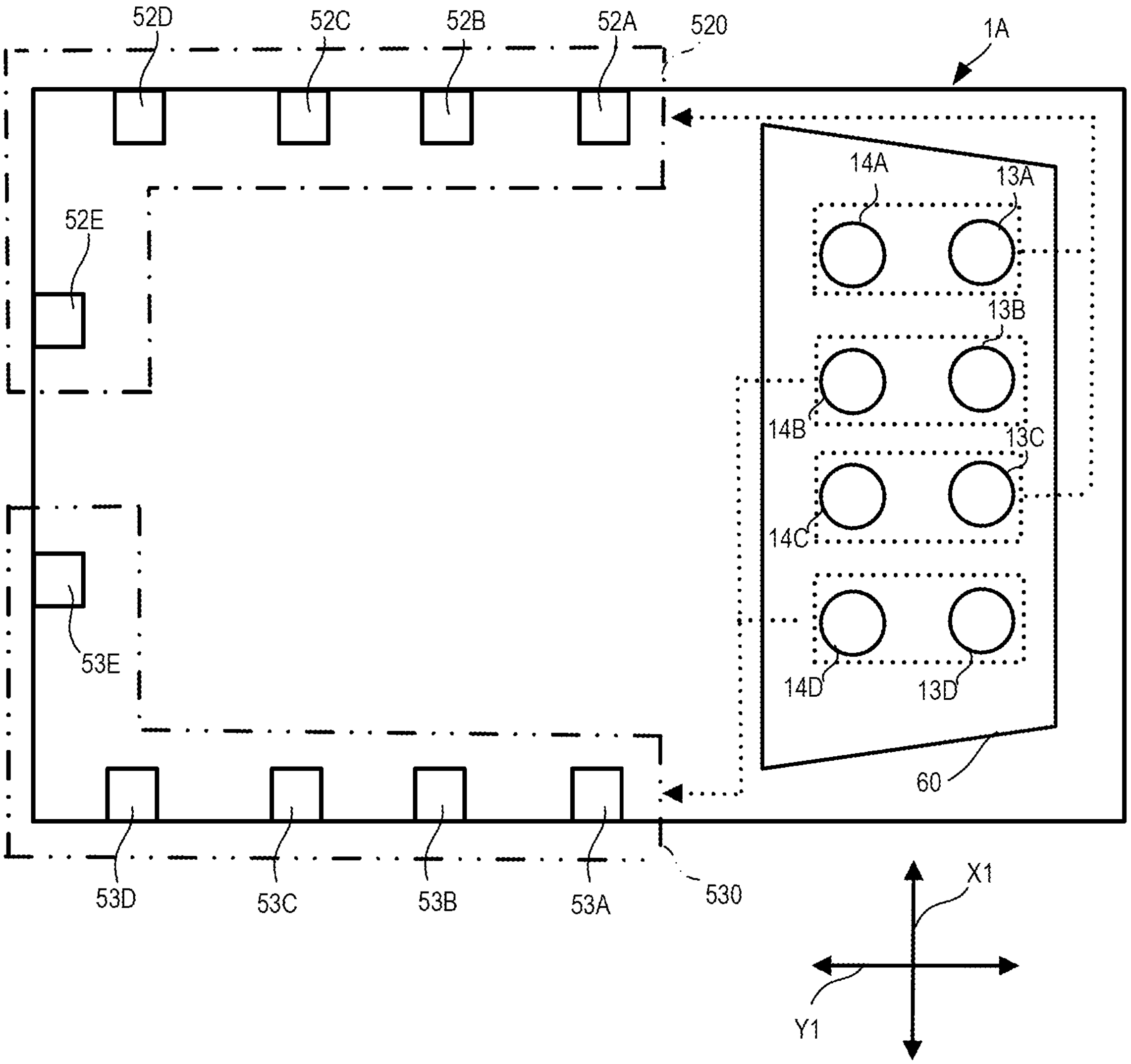
FIG. 9 is a plan view schematically showing the space of the second embodiment.
Figure 10:
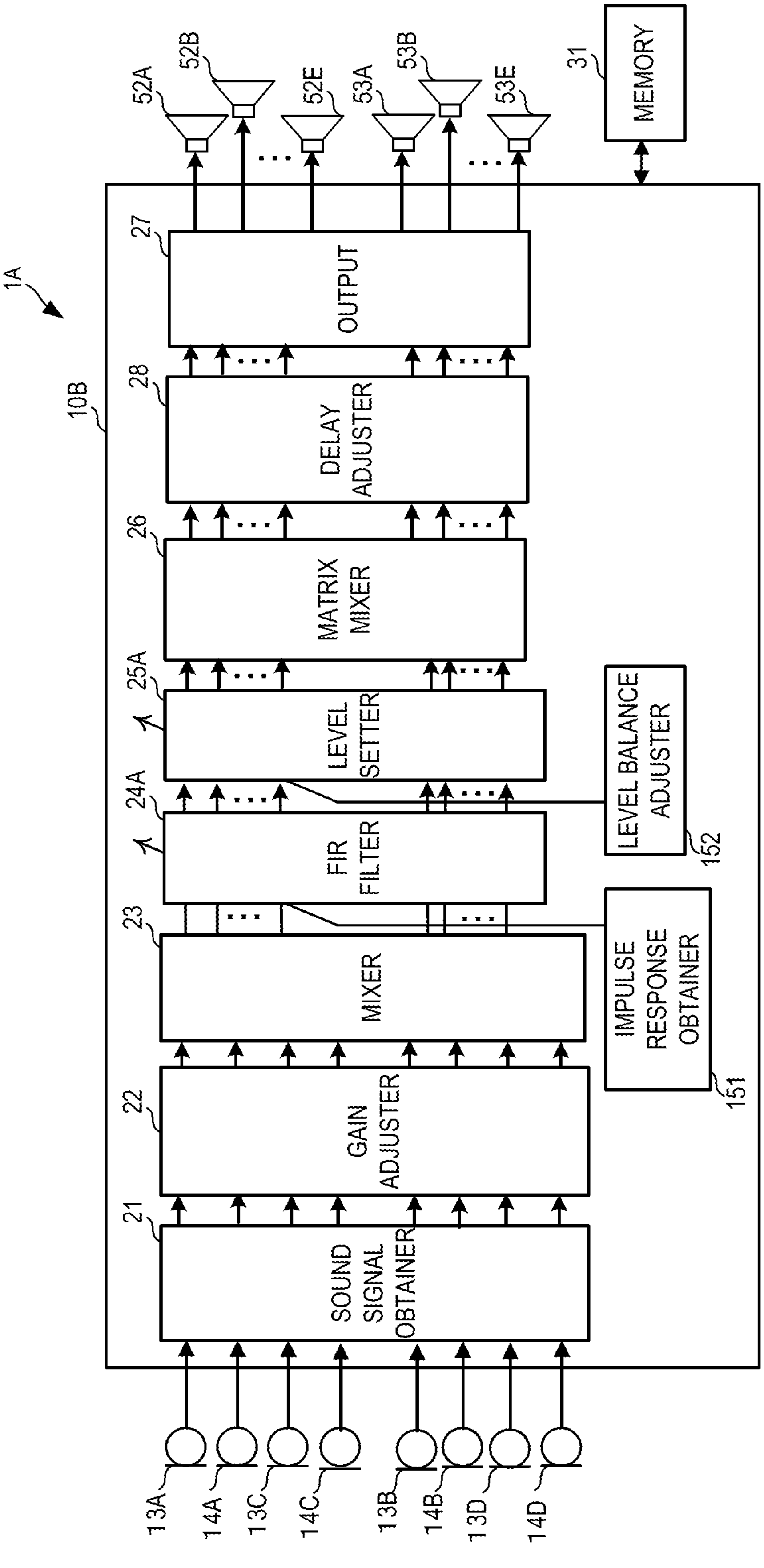
FIG. 10 is a block diagram showing a configuration of a sound field support system of the second embodiment.

A sound field support system 1A of a second embodiment will be described with reference to FIGS. 8, 9, 10, and 11. FIG. 8 is a perspective view schematically showing the space 620. FIG. 9 is a plan view of the space 620 in a plan view. FIG. 10 is a block diagram showing the configuration of the sound field support system 1A.

Figure 11:
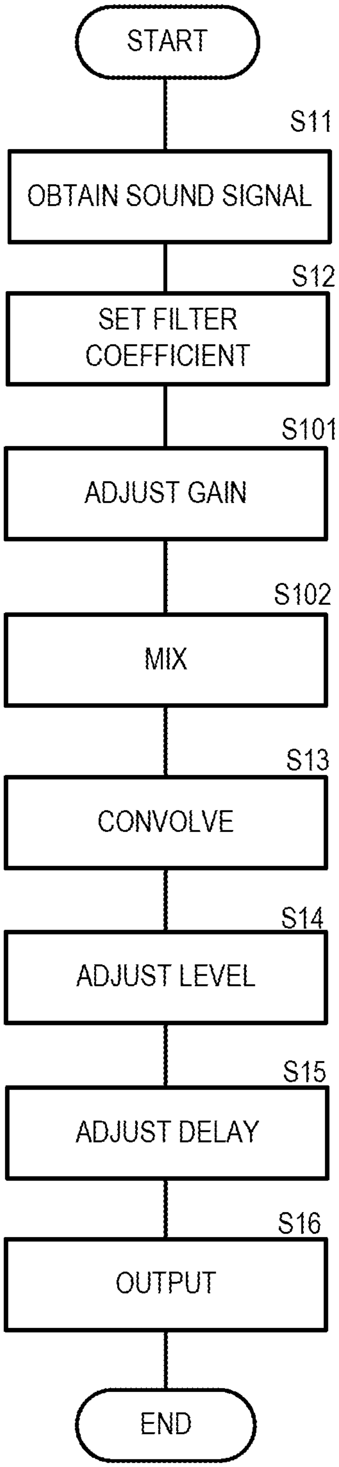
FIG. 11 is a flowchart showing an operation of a sound signal processing device of the second embodiment.

FIG. 11 is a flowchart showing the operation of the sound signal processing device. This example assumes that the sound source 61 moves on the stage 60, or that a plurality of sound sources 61 are on the stage 60. Note that the same components as those of the first embodiment are denoted by the same reference numerals, and the description thereof will be omitted.

As shown in FIGS. 8 and 9, the sound field support system 1A includes a speaker 52A, a speaker 52B, a speaker 52C, a speaker 52D, a speaker 52E, a speaker 53A, a speaker 53B, a speaker 53C, a speaker 53D, and a speaker 53E.

In this example, as shown in FIGS. 8 and 9, the speaker 52A, the speaker 52B, the speaker 52C, the speaker 52D, and the speaker 52E belong to a 2-1 speaker group 520 (to the left of the center as the stage 60 faces) that outputs an early reflected sound control signal of a 2-1 route. Also, in this example, the speaker 53A, the speaker 53B, the speaker 53C, the speaker 53D, and the speaker 53E belong to a 2-2 speaker group 530 (to the right of the center as the stage 60 faces) which outputs an early reflected sound control signals of a 2-2 route. A chain line shown in FIG. 9 indicates the 2-1 speaker group 520, and a chain double-dashed line indicates the 2-2 speaker group 530.

In the following description, the speaker 52A, the speaker 52B, the speaker 52C, the speaker 52D, and the speaker 52E of the 2-1 speaker group 520 will be collectively referred to as a speaker of the 2-1 speaker group 520. Also, in the following description, the speaker 53A, the speaker 53B, the speaker 53C, the speaker 53D, and the speaker 53E of the 2-2 speaker group 530 will be collectively referred to as a speaker of the 2-2 speaker group 530.

As shown in FIGS. 8 and 9, the sound field support system 1A includes, in the room 62, a directional microphone 13A, a directional microphone 13B, a directional microphone 13C, a directional microphone 13D, a directional microphone 14A, a directional microphone 14B, a directional microphone 14C, and a directional microphone 14D.

In this example, the directional microphone 13A, the directional microphone 13B, the directional microphone 13C, and the directional microphone 13D are disposed on the ceiling side by side in an X1 direction (right-left direction) shown in FIGS. 8 and 9. Also, in this example, the directional microphone 14A, directional microphone 14B, directional microphone 14C, and directional microphone 14D are disposed on the ceiling side by side in the X1 direction (right-left direction) shown in FIGS. 8 and 9. The directional microphone 14A, the directional microphone 14B, the directional microphone 14C, and the directional microphone 14D are arranged behind, in a Y1 direction (front-rear direction), (closer to the audience seats in the lateral view of the stage 60) than the directional microphone 13A, the directional microphone 13B, the directional microphone 13C, and the directional microphone 13D.

As shown in FIG. 9, the directional microphone 13A, the directional microphone 13C, the directional microphone 14A, and the directional microphone 14C correspond to the speakers of the 2-1 speaker group 520. That is, on the basis of the sound signals collected by the directional microphone 13A, the directional microphone 13C, the directional microphone 14A, and the directional microphone 14C, an early reflected sound control signal of the 2-1 route is generated. The directional microphone 13B, the directional microphone 13D, the directional microphone 14B, and the directional microphone 14D correspond to the speakers of the 2-2 speaker group 530. That is, on the basis of the sound signals collected by the directional microphone 13B, the directional microphone 13D, the directional microphone 14B, and the directional microphone 14D, an early reflected sound control signal of the 2-2 route is generated.

In the following description, the directional microphone 13A, the directional microphone 13C, the directional microphone 14A, and the directional microphone 14C will be collectively referred to as a directional microphone corresponding to the 2-1 speaker group 520. Also, in the following description, the directional microphone 13B, the directional microphone 13D, the directional microphone 14B, and the directional microphone 14D will be collectively referred to as a directional microphone corresponding to the 2-2 speaker group 530.

As shown in FIG. 10, the sound signal processor 10A of the sound field support system 1A has a configuration formed by removing the FIR filter 24B and the level setter 25B from the sound field support system 1 of the first embodiment. However, the second embodiment may also include the FIR filter 24B and the level setter 25B to generate a reverberant sound control signal. In that case, the reverberant sound control signal may be output to any one of the speakers 52A to 53E or may be output from another speaker.

The sound signal obtainer 21 obtains a sound signal from each of the directional microphone corresponding to the 2-1 speaker group 520 and the directional microphone corresponding to the 2-2 speaker group 530 (cf. FIG. 10).

The gain adjuster 22 adjusts the gain of the sound signal obtained from each of the directional microphone corresponding to the 2-1 speaker group 520 and the directional microphone corresponding to the 2-2 speaker group 530 (cf. FIG. 11, S101).

In this example, the gain adjuster 22 sets a different gain for each of the directional microphones corresponding to the 2-1 speaker group 520 and for each of the directional microphones corresponding to the 2-2 speaker group 530.

The gain adjuster 22 sets the gains of the sound signals to be higher in ascending order of the distance to the speaker (e.g., speaker 52A) of the 2-1 speaker group 520 in the right-left direction among the directional microphones corresponding to the 2-1 speaker group 520.

Among the directional microphones corresponding to the 2-1 speaker group 520, the gain adjuster 22 sets the gain of the sound signal of the directional microphone on the front side in the lateral view of the stage 60 (on the right side of the paper of FIG. 9) in the front-rear direction (the right-left direction of the paper of FIG. 9) to be lower than the gain of the sound signal of the directional microphone on the side where the distance to the audience seats is shorter (on the left side of the paper of FIG. 9).

Similarly to the above, the gain adjuster 22 sets the gains of the sound signals higher in ascending order of the distance to the speaker (e.g., speaker 53A) of the 2-2 speaker group 530 in the right-left direction among the directional microphones corresponding to the 2-2 speaker group 530.

Among the directional microphones corresponding to the 2-2 speaker group 530, the gain adjuster 22 sets the gain of the sound signal of the directional microphone on the front side in the lateral view of the stage 60 (on the right side of the paper of FIG. 9) in the front-rear direction (the right-left direction of the paper of FIG. 9) to be lower than the gain of the sound signal of the directional microphone on the side where the distance to the audience seats is shorter (on the left side of the paper of FIG. 9).

The gain adjuster 22 sets the gain of the directional microphone 14A to 0 dB, sets the gain of the directional microphone 13A to −1.5 dB, sets the gain of the directional microphone 14C to −3.0 dB, and sets the gain of the directional microphone 13C to −4.5 dB, for example.

The gain adjuster 22 sets the gain of the directional microphone 14D to 0 dB, sets the gain of the directional microphone 13D to −1.5 dB, sets the gain of the directional microphone 14B to −3.0 dB, and sets the gain of the directional microphone 13B to −4.5 dB, for example.

The mixer 23 mixes sound signals obtained from the respective directional microphones corresponding to the 2-1 speaker group 520 (cf. FIG. 11, S102). The mixer 23 distributes the mixed sound signal to a plurality of (five in FIGS. 8 and 9) signal processing routes in accordance with the number (e.g., five) of speakers of the 2-1 speaker group 520. Also, the mixer 23 mixes sound signals obtained from the respective directional microphones corresponding to the 2-2 speaker group 530. The mixer 23 distributes the mixed sound signal to a plurality of (five in FIGS. 8 and 9) signal processing routes in accordance with the number (e.g., five) of speakers of the 2-2 speaker group 530.

In the real space, sound image localization varies depending on the arrival direction of the direct sound or the early reflected sound, the level, and the density of the reflected sound. That is, the sound image localization of the sound source 61 in the audience seats depends on the position of the sound source 61 on the stage 60. For example, when the sound source 61 moves to the left toward the stage 60, the level of the direct sound coming from the left direction and the level of the early reflected sound are relatively high in the audience seats, whereby the sound image is localized on the left side toward the stage 60. The gain adjuster 22 sets the gain of the sound signal to be higher in ascending order of the distance to the speaker among the plurality of directional microphones, controls the level of the early reflected sound in accordance with the position of the sound source 61 on the stage 60, and realizes sound image localization close to a phenomenon in the real space.

The delay adjuster 28 adjusts the delay time in accordance with the distances between the plurality of directional microphones and speakers. For example, the delay adjuster 28 sets the delay time to be smaller in ascending order of the distance between the directional microphone and the speaker in each of the plurality of directional microphone. Thus, the time difference of the early reflected sound output by each of the plurality of speakers is reproduced in accordance with the distance between the sound source 61 and the speakers.

Further, the sound field support system 1A arranges a plurality of directional microphones in the right-left direction to obtain sounds of the sound source 61 over a wide range on the stage 60. Thus, the sound field support system 1A can reflect the level of the early reflected sound corresponding to the position of the sound source 61 in a state close to the real space without detecting the position of the sound source 61.

When the sound source 61 and the audience-seat side are further away from each other in the real space, the level of the early reflected sound is also lowered. The gain adjuster 22 sets the gain of a sound signal of a speaker farther from the audience seats to be lower in the front-rear direction to realize sound vibrations in the real space.

Further, when the sound source 61 and the audience-seat side are further away from each other in the real space, the time required for the direct sound to reach the audience seats from the sound source 61 becomes longer. Therefore, by the delay adjuster 28 setting the delay time of the early reflected sound signal, output to the speaker farther from the audience seats, to be large, the sound field support system 1A can more accurately realize the sound vibrations in the real space.

As described above, the sound field support system 1A of the second embodiment can generate an early reflected sound control signal corresponding to the position of the sound source 61 without separately obtaining the position information of the sound source 61 by setting the gain of the directional microphone in accordance with the positional relationship between the sound source and the speaker even when the sound source 61 moves on the stage 60 or even when there are a plurality of sound sources 61. Therefore, the sound field support system 1 can effectively realize sound image localization and can realize a richer sound image and more spatial expansion than before.

Note that the gain value of the sound signal of the directional microphone is not limited to this example. The explanation has been made using the example where the gain of the sound signal of the speaker farther from the audience seats is set to be lower than the gain of the sound signal of the speaker closer to the audience seats, but the present disclosure is not limited to this example.

The sound field support system 1A of the second embodiment has been described using eight directional microphones, but the present disclosure is not limited thereto. The number of directional microphones may be less than eight or more than nine. The position of the directional microphone is not limited to this example, either.

Further, in the sound field support system 1A of the second embodiment, the description has been made using five speakers of the 2-1 speaker group 520 and five speakers of the 2-2 speaker group 530, but the present disclosure is not limited thereto. The number of speaker groups may be three or more, and the number of speakers belonging to each speaker group only need be one or more. The position of the speaker is not limited to this example, either.

In the sound field support system 1A of the second embodiment, for example, one directional microphone may be caused to correspond to both the 2-1 speaker group 520 and the 2-2 speaker group 530. In this case, the gain of the sound signal corresponding to the 2-1 speaker group 520 (2-1 route) may be different from the gain of the sound signal corresponding to the 2-2 speaker group 530 (2-2 route).

In the second embodiment, for example, the following configurations can be adopted, and the following operation and effect can be obtained in each configuration.

(2-1) A sound signal processing method includes: obtaining a plurality of sound signals respectively collected by a plurality of microphones arranged in a space; adjusting respective levels of the plurality of sound signals in accordance with the respective positions of the plurality of microphones; mixing the plurality of sound signals having the adjusted respective levels to thereby obtain a mixed signal; and generating a reflected sound by using the obtained mixed signal.

Figure 12:
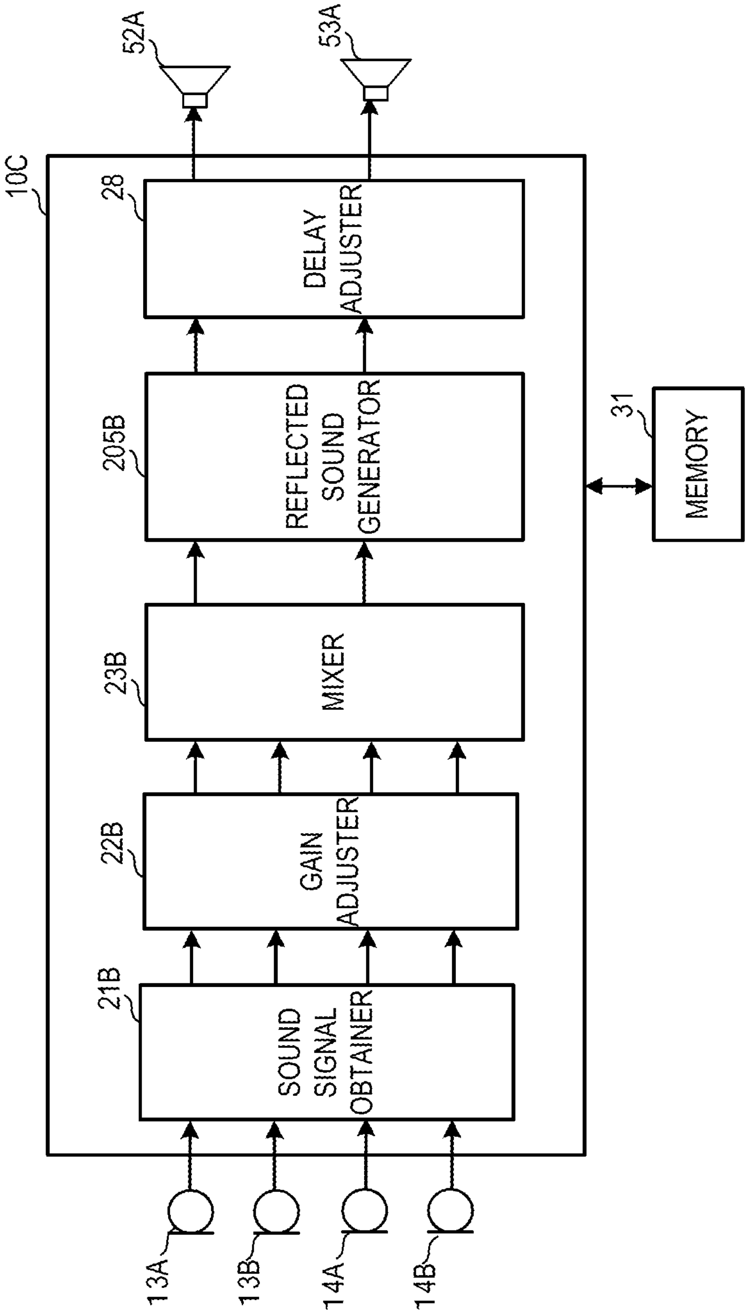
FIG. 12 is a block diagram showing the minimum configuration of a sound field support system of the second embodiment.

FIG. 12 is a block diagram showing a configuration of a sound signal processor 10C corresponding to the signal processing method of the second embodiment. The sound signal processor 10C is provided with: a sound signal obtainer 21B that obtains a plurality of sound signals collected by a plurality of directional microphones 13A, 13B, 14A, 14B arranged in a predetermined space, respectively; a gain adjuster 22B that adjusts the levels of the plurality of sound signals in accordance with the respective positions of the plurality of directional microphones 13A, 13B, 14A, 14B; a mixer 23B that mixes the adjusted plurality of sound signals; and a reflected sound generator 205B that generates a reflected sound systematically by using the mixed signal obtained by the mixing and outputs the generated sound to each of the speaker 52A and the speaker 53A.

The sound signal obtainer 21B has the same function as that of the sound signal obtainer 21 shown in FIG. 10. The gain adjuster 22B has the same function as that of the gain adjuster 22 shown in FIG. 10. The mixer 23B has the same function as the mixer 23 shown in FIG. 10. The reflected sound generator 205B has the same function as the FIR filter 24A and the level setter 25A of FIG. 10.

Similarly to the sound signal processor 10B of FIG. 10, the sound signal processor 10C realizes more effective sound image localization by changing the level of the signal collected from the sound signal obtainer 21B in accordance with the position of the sound source without the need to detect the position of the sound source.

(2-2) The respective level of each of the plurality of sound signals may be adjusted in accordance with a distance from each of the respective positions of the plurality of microphones to a speaker that outputs the reflected sound.

In the real space, sound image localization varies depending on the arrival direction of the direct sound or the early reflected sound, the level, and the density of the reflected sound. Therefore, in this configuration, the sound vibrations in the real space are reproduced more.

(2-3) A gain for each of the plurality of sound signals may be set to be higher in ascending order of the distance from each of the respective positions of the plurality of microphones to the respective position of the speaker that outputs the reflected sound.

In this configuration, by setting the gain of the sound signal to be higher in ascending order of the distance to the speaker among the directional microphones, the attenuation of the reflected sound depending on the distance between the sound source and the wall is reproduced, and the sound vibrations in the real space are further realized.

(2-4) A delay may be adjusted in accordance with the distance from each of the respective positions of the plurality of microphones to the speaker that outputs the reflected sound. In this configuration, sound image localization close to a phenomenon in the real space is realized.

(2-5) A delay time of the reflected sound is set to increase as the distance from each of the respective positions of the plurality of microphones to the speaker that outputs the reflected sound increases.

In this configuration, the delay of the reflected sound depending on the distance between the sound source and the wall is reproduced.

(2-6) A sound signal generation device may include a speaker that outputs a reflected sound, the speaker that outputs the reflected sound may include a 2-1 speaker group of a 2-1 route and a 2-2 speaker group of a 2-2 route, a level adjuster may adjust the respective level for each sound signal for each of the 2-1 route and the 2-2 route, and the mixing unit may perform mixing for each of the 2-1 route and the 2-2 route.

With such a configuration formed, sound image localization can be realized more effectively.

(2-7) It is preferable that the sound signal generator include a plurality of microphones arranged in a predetermined space, and the plurality of microphones be distinguished into a plurality of 2-1 microphones corresponding to the 2-1 speaker group and a plurality of 2-2 microphones corresponding to the 2-2 speaker group.

With such a configuration formed, it is possible to more effectively realize sound image localization even when the position of the sound source moves or there are a plurality of sound sources.

(2-8) The reflected sound may include an early reflected sound.

Third Embodiment

Figure 13:
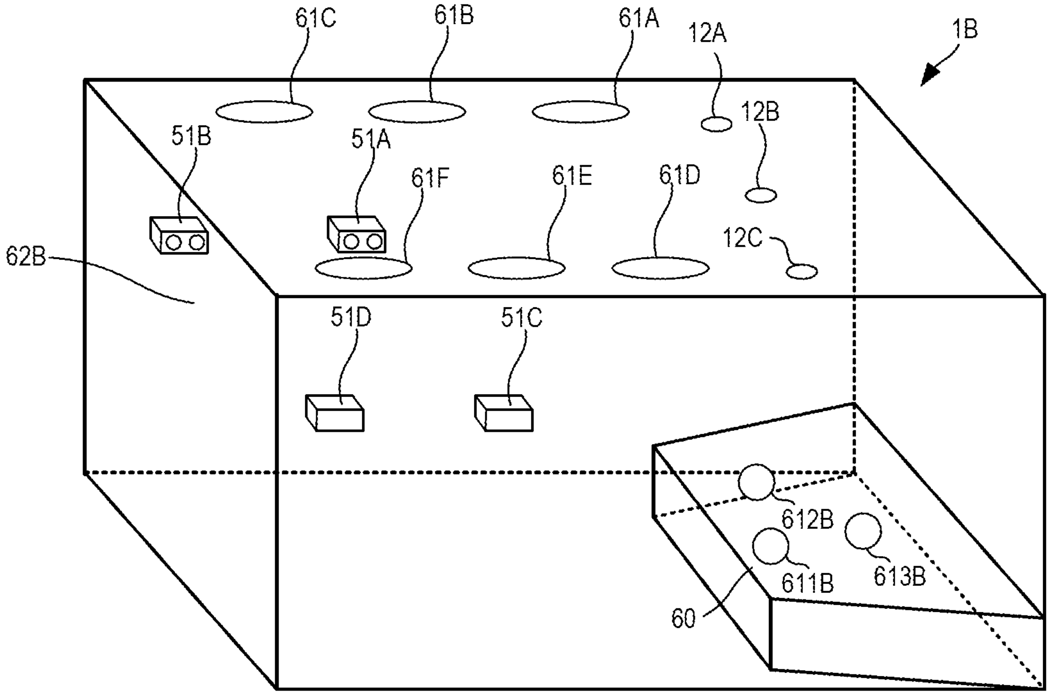
FIG. 13 is a perspective view schematically showing the space of a third embodiment.
Figure 14:
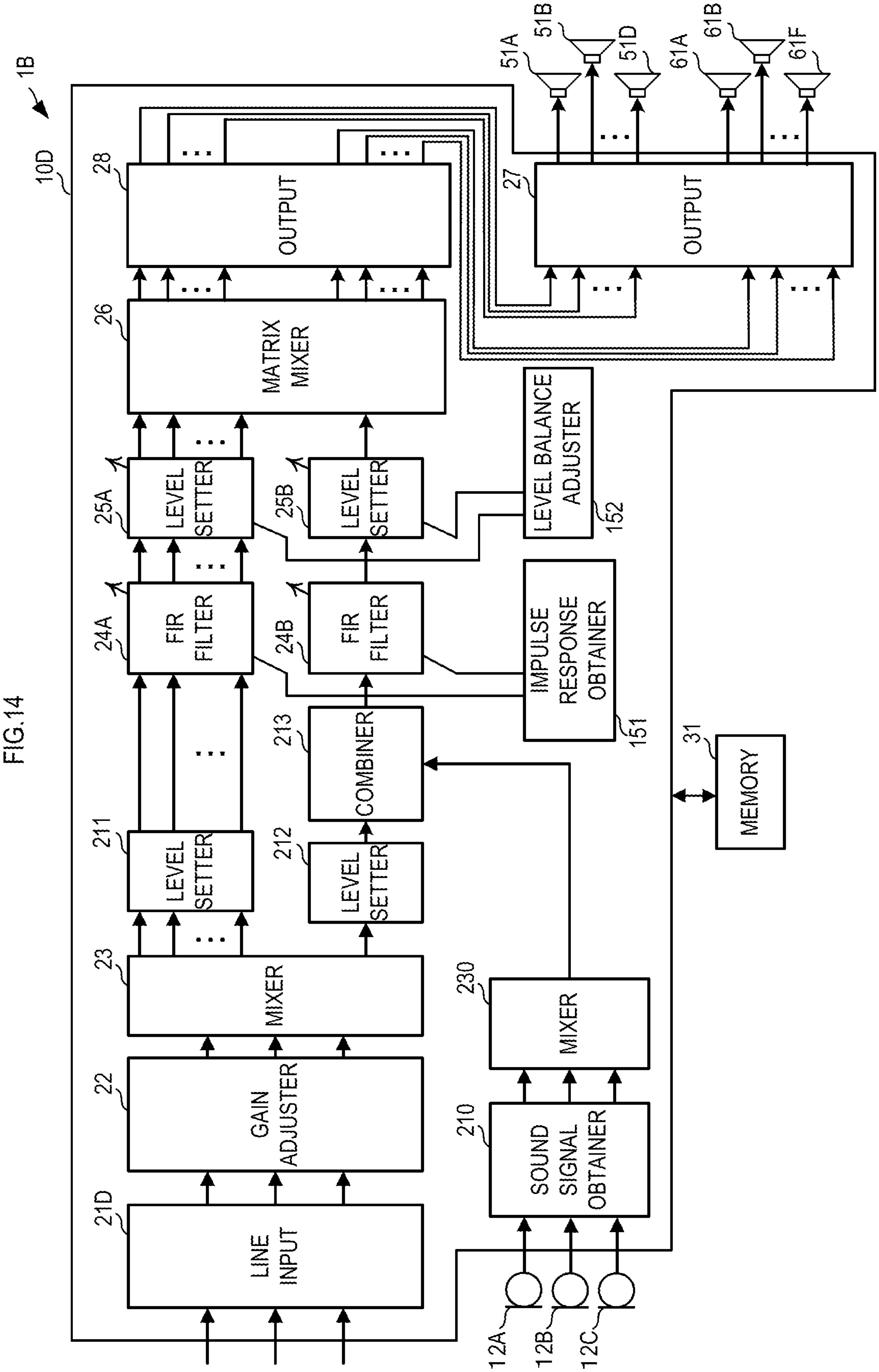
FIG. 14 is a block diagram showing a configuration of a sound field support system.
Figure 15:
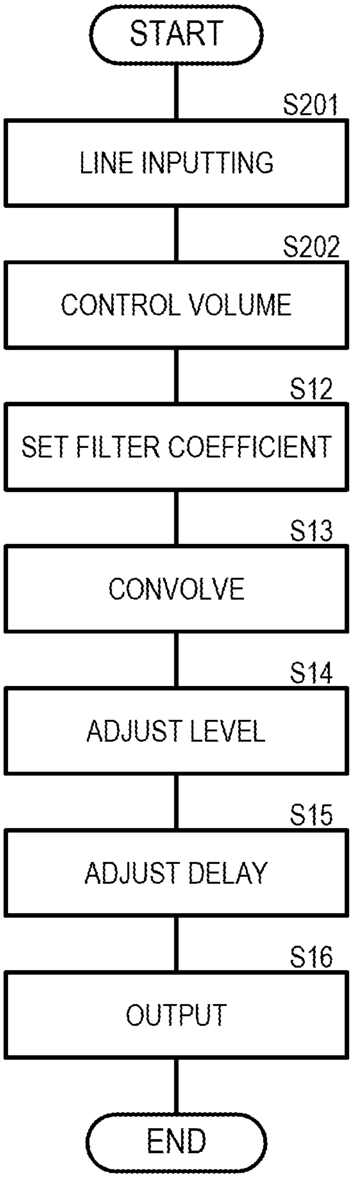
FIG. 15 is a flowchart showing an operation of a sound signal processing device of the third embodiment.

A sound field support system 1B of a third embodiment will be described with reference to FIGS. 13, 14, and 15. FIG. 13 is a perspective view schematically showing a room 62B of the third embodiment. FIG. 14 is a block diagram showing the configuration of the sound field support system 1B. FIG. 15 is a flowchart showing an operation of a sound signal processing device of the third embodiment. The third embodiment assumes that output sounds from a sound source 611B, a sound source 612B, and a sound source 613B are line-inputted sound signals. Note that the same components as those of the first embodiment are denoted by the same reference numerals, and the description thereof will be omitted. The line inputted sound signal does not mean receiving a sound output from a sound source, such as various musical instruments, described later by collecting the sound with a microphone, but means receiving a sound signal from an audio cable connected to the sound source. In contrast, the line output means that an audio cable is connected to the sound source, such as various musical instruments, described later, and the sound source outputs a sound signal by using the audio cable. The room 62B does not require the directional microphone 11A, the directional microphone 11B, or the directional microphone 11C with respect to the room 62 shown in the first embodiment. Note that the directional microphone 11A, the directional microphone 11B, and the directional microphone 11C may be arranged.

The sound source 611B, the sound source 612B, and the sound source 613B are, for example, an electronic piano, an electric guitar, and the like, and each line-output a sound signal. That is, the sound source 611B, the sound source 612B, and the sound source 613B are connected to an audio cable and output a sound signal via the audio cable. In FIG. 13, the number of sound sources is three, but the number may be one or may be plural, such as two or four or more.

A sound signal processor 10D of the sound field support system 1B is different from the sound signal processor 10 shown in the first embodiment in that further including a line input 21D, a sound signal obtainer 210, a level setter 211, a level setter 212, a combiner 213, and a mixer 230. The other components of the sound signal processor 10D are the same as those of the sound signal processor 10, and the descriptions of the same components are omitted.

The line input 21D receives sound signals from the sound source 611B, the sound source 612B, and the sound source 613B (cf. FIG. 15, S201). That is, the line input 21D is connected to the sound source 611B, the sound source 612B, and the audio cable connected to the sound source 613B. The line input 21D receives the sound signals from the sound source 611B, the sound source 612B, and the sound source 613B via the audio cable. Hereinafter, this sound signal will be referred to as a line inputted sound signal. A line input 21D outputs the line inputted sound signal of each sound source to the gain adjuster 22.

The gain adjuster 22 corresponds to a volume controller and controls the volume of the line inputted sound signal (cf. FIG. 15, S202). Specifically, the gain adjuster 22 performs volume control on each of the line inputted sound signal of the sound source 611B, the line inputted sound signal of the sound source 612B, and the line inputted sound signal of the sound source 613B by using individual gains. The gain adjuster 22 outputs the line inputted sound signal after the volume control to the mixer 23.

The mixer 23 mixes the line inputted sound signal of the sound source 611B after the volume control, the line inputted sound signal of the sound source 612B after the volume control, and the line inputted sound signal of the sound source 613B after the volume control.

The mixer 23 distributes the mixed sound signal to a plurality of signal processing routes. Specifically, the mixer 23 distributes the mixed sound signal to a plurality of signal processing routes for the early reflected sound and a signal processing route for the reverberant sound. Hereinafter, the sound signal distributed to the plurality of signal processing routes for the early reflected sound will be referred to as a mixed signal for the early reflected sound, and the sound signal distributed to the signal processing routes for the reverberant sound will be referred to as a mixed signal for the reverberant sound.

The mixer 23 outputs the mixed signal for the early reflected sound to the level setter 211. The mixer 23 outputs the mixed signal for the reverberant sound to the level setter 212.

The level setter 211 adjusts the level of the mixed signal for the early reflected sound. The level setter 212 adjusts the level of the mixed signal for the reverberant sound. The level balance adjuster 152 sets the level adjustment of the level setter 211 and the level adjustment of the level setter 212 in the same manner as the level setter 25A and the level setter 25B.

The level setter 211 outputs the mixed signal for the early reflected sound after the level adjustment to an FIR filter 24A. The level setter 212 outputs the mixed signal for the reverberant sound after the level adjustment to a combiner 213.

The sound signal obtainer 210 obtains collected sound signals from the omnidirectional microphone 12A, the omnidirectional microphone 12B, and the omnidirectional microphone 12C. The sound signal obtainer 210 outputs the obtained, collected sound signals to the mixer 230. The mixer 230 mixes the collected sound signals from the sound signal obtainer 210. The mixer 230 outputs the collected sound signal after the mixing to the combiner 213.

The combiner 213 combines (adds) the mixed signal for the reverberant sound after the level adjustment from the level setter 212 and the collected sound signal after the mixing from the mixer 230. The combiner 213 outputs the combined signal to the FIR filter 24B.

The FIR filter 24A convolves the impulse response for the early reflected sound into the mixed signal for the early reflected sound after the level adjustment to generate an early reflected sound control signal. The FIR filter 24B convolves the impulse response for the reverberant sound into the combined signal to generate a reverberant sound control signal.

The level setter 25A adjusts the level of the early reflected sound control signal. The level setter 25B adjusts the level of the reverberant sound control signal.

The matrix mixer 26 distributes the sound signal having been input to an output route for each speaker. The matrix mixer 26 distributes the reverberant sound control signal to each of the output routes of the speakers 61A to 61F and outputs the signal to the delay adjuster 28. The matrix mixer 26 distributes the early reflected sound control signal to each of the output routes of the speakers 51A to 51D and outputs the signal to the delay adjuster 28.

The delay adjuster 28 adjusts the delay time in accordance with the distances between the sound source 611B, the sound source 612B, and the sound source 613B and the plurality of speakers. Thus, the delay adjuster 28 can adjust the phases of the reverberant sound control signal and the early reflected sound control signal output from each of the plurality of speakers in accordance with the positional relationship (distances) between the sound source 611B, the sound source 612B, and the sound source 613B, and the plurality of speakers.

The output 27 converts the early reflected sound control signal and the reverberant sound control signal output from the delay adjuster 28 into analog signals. The output 27 amplifies the analog signal. The output 27 outputs the amplified analog signal to the corresponding speaker.

By the above configuration and processing, the sound signal processor 10D can realize a richer sound image and more spatial expansion than before for the line inputted sound signal. Therefore, the sound signal processor 10D can realize a desired sound field support for a sound source having a line output such as an electronic musical instrument.

Furthermore, the sound signal processor 10D generates an early reflected sound control signal by using the line inputted sound signal. The line inputted sound signal has a higher S/N ratio than the sound signal collected by the microphone. Hence, the sound signal processor 10D can generate an early reflected sound control signal without being affected by noise. As a result, the sound signal processor 10D can more reliably realize a desired sound field having a richer sound image and more spatial expansion than before.

Also, the sound signal processor 10D controls the volume of the line inputted sound signal and generates an early reflected sound control signal by using the line inputted sound signal after the volume control. Each electronic musical instrument has a different default volume level. Therefore, unless the volume control is performed, for example, when the electronic musical instrument to be line-input is switched, a desired early reflected sound control signal cannot be generated. However, the sound signal processor 10D can control the volume of the line inputted sound signal to make constant the level of the sound signal for generating the early reflected sound control signal. Thus, the sound signal processor 10D can generate a desired early reflected sound control signal even when, for example, an electronic apparatus to be line-input is switched.

The sound signal processor 10D controls the volumes of a plurality of line inputted sound signals and then mixes the signals. The sound signal processor 10D generates an early reflected sound control signal by using the mixed sound signal. Thus, the sound signal processor 10D can properly adjust the level balance of the plurality of line inputted sound signals. Therefore, the sound signal processor 10D can generate a desired early reflected control signal even when there are a plurality of line inputted sound signals.

Note that the sound signal processor 10D can obtain these operations and effects not only on the early reflected sound control signal but also on the reverberant sound control signal.

The sound signal processor 10D uses only a line inputted sound signal to generate the early reflected sound control signal. On the other hand, the sound signal processor 10D uses a line inputted sound signal and a collected sound signal, collected by an omnidirectional microphone, to generate the reverberant sound control signal. By individually controlling the early reflected sound and the reverberant sound, the blur of the sound image is prevented, to realize a rich sound image and spatial expansion. Furthermore, by using a collected sound signal collected by the omnidirectional microphone as the reverberant sound control signal, the effect of the sound field support can be extended not only to the sound of the sound source such as the electronic musical instrument but also to the sound generated in a space such as the applause of the audience. Therefore, by providing this configuration, the sound signal processor 10D can realize flexible sound field support.

Note that the above description does not describe the reproduction of the direct sound. However, the sound signal processor 10D may include a direct sound processing route as a processing route different from the configuration described above.

In this case, for example, the sound signal processor 10D performs the level adjustment on the output of the mixer 23, that is, the mixed sound signal and outputs the signal to a separately disposed stereo speaker or the like.

For example, the sound signal processor 10D performs the level adjustment on the mixed sound signal and outputs the signal to the matrix mixer 26. The matrix mixer 26 mixes the direct sound signal, the early reflected sound control signal, and the reverberant sound control signal, and outputs the mixed signal to the output 27. In this case, the matrix mixer 26 may set a dedicated speaker for the direct sound signal and mix the direct sound signal, the early reflected sound control signal, and the reverberant sound control signal so as to output the sound signal directly to the dedicated speaker.

In the above description, the sound source 611B, the sound source 612B, and the sound source 613B are, for example, electronic musical instruments. However, the sound source 611B, the sound source 612B, and the sound source 613B may be arranged in the vicinity of the singer, such as a hand microphone held by a singer or a stand microphone disposed in the vicinity of the singer, and collect the voice of the singer to output a singing sound signal.

In the third embodiment, for example, the following configurations can be adopted, and the following operation and effect can be obtained in each configuration. In the following description, the same parts as those described above are omitted.

(3-1) One embodiment according to the third embodiment of the present disclosure is a sound signal processing method including: receiving a line-inputted sound signal; controlling the volume of the line-inputted sound signal; and generating an early reflected sound control signal using the line-inputted sound signal having the controlled volume.

Figure 16:
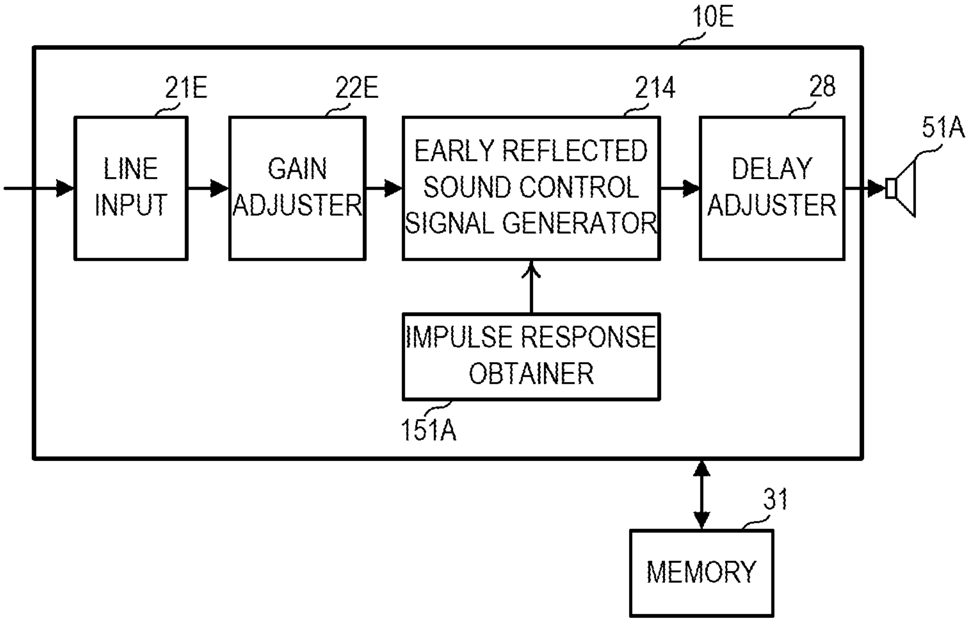
FIG. 16 is a block diagram showing a configuration of a sound signal processor.

FIG. 16 is a block diagram showing a configuration of a sound signal processor 10E corresponding to the sound signal processing method described above. The sound signal processor 10E includes a line input 21E, a gain adjuster 22E, an early reflected sound control signal generator 214, an impulse response obtainer 151A, and the delay adjuster 28.

The line input 21E receives one line inputted sound signal and outputs the signal to a gain adjuster 22E. The gain adjuster 22E controls the volume of the line inputted sound signal. The gain adjuster 22E outputs the volume-controlled line inputted sound signal to the early reflected sound control signal generator 214.

The early reflected sound control signal generator 214 convolves impulse response data for the early reflected sound into the line inputted sound signal subjected to the volume control to generate an early reflected sound control signal. The early reflected sound control signal generator 214 obtains, for example, impulse response data from a memory and uses the data for convolution, as in the embodiment described above. The early reflected sound control signal generator 214 outputs the early reflected sound control signal to the delay adjuster 28. The delay adjuster 28 adjusts the delay time of the early reflected sound control signal in the same manner as described above and outputs the delay time to the speaker 51A. When there are a plurality of speakers, the matrix mixer 26 may be provided in the same manner as the sound signal processor 10 as described above. The matrix mixer 26 distributes and outputs the early reflected sound control signal to the plurality of speakers.

With this configuration and method, the sound signal processor 10E can appropriately generate an early reflected sound control signal for one line inputted sound signal and can realize a desired sound field having a richer sound image and more spatial expansion than before.

(3-2) One embodiment according to the third embodiment of the present disclosure is a sound signal processing method in which a plurality of line-inputted sound signals are respectively received via a plurality of line inputs, and in the controlling the volume, a plurality of line-inputted sound signals are controlled in volume for each of the plurality of line inputs.

With this configuration and method, the sound signal processor can appropriately generate an early reflected sound control signal for the plurality of line inputted sound signals and can realize a desired sound field having a richer sound image and more spatial expansion than before. Further, the sound signal processor can properly adjust the level balance between the plurality of line inputted sound signals and can realize a desired sound field having a rich sound image and spatial expansion.

(3-3) One embodiment according to the third embodiment of the present disclosure is a sound signal processing method including: mixing the plurality of line-inputted sound signals having the controlled volumes to thereby obtain a mixed sound signal; and generating the early reflected sound control signal using the mixed sound signal.

Figure 17:
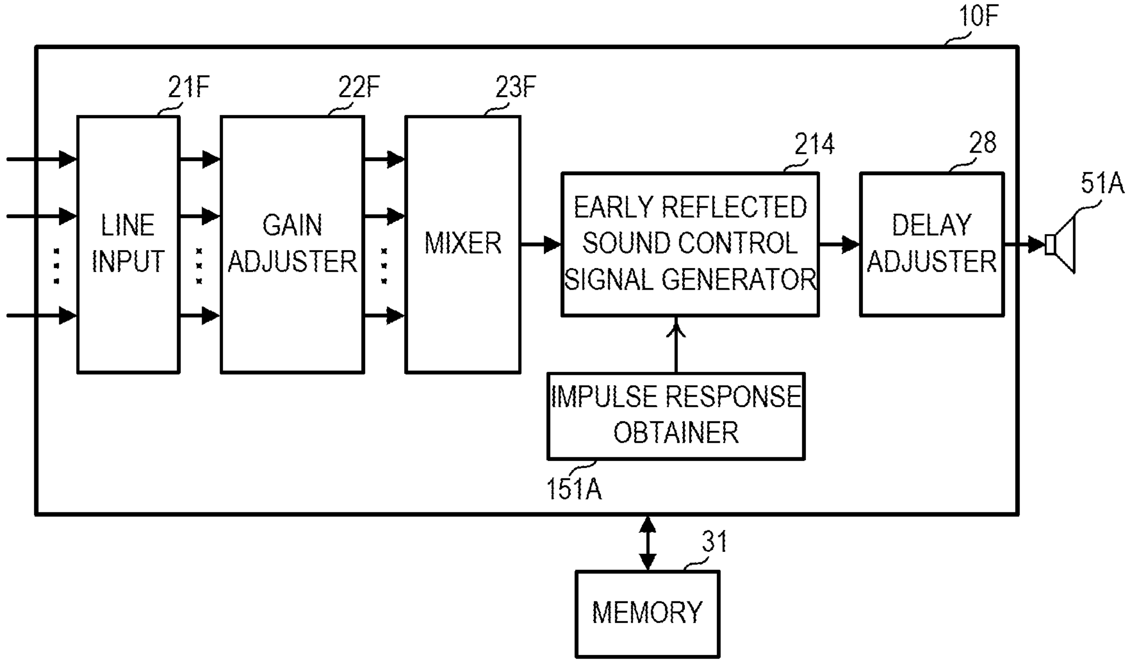
FIG. 17 is a block diagram showing the configuration of the sound signal processor.

FIG. 17 is a block diagram showing a configuration of a sound signal processor 10F corresponding to the sound signal processing method described above. The sound signal processor 10F includes a line input 21F, a gain adjuster 22F, a mixer 23F, an early reflected sound control signal generator 214, an impulse response obtainer 151A, and the delay adjuster 28.

The line input 21F receives a plurality of line inputted sound signals and outputs the signals to the gain adjuster 22F. The gain adjuster 22F controls the volumes of the plurality of line inputted sound signals. At this time, the gain adjuster 22F sets an individual gain for each of the plurality of line inputted sound signals to control the volume. For example, the gain adjuster 22F sets individual gains based on the level balance of the plurality of line inputted sound signals. A gain adjuster 22F outputs a plurality of line inputted sound signals after the volume control to a mixer 23F.

The mixer 23F mixes and outputs the plurality of line inputted sound signals after the volume control. The mixer 23F outputs the mixed signal to the early reflected sound control signal generator 214.

The early reflected sound control signal generator 214 convolves an impulse response for the early reflected sound into the mixed signal to generate an early reflected sound control signal. The early reflected sound control signal generator 214 outputs the early reflected sound control signal to the delay adjuster 28. The delay adjuster 28 adjusts the delay time of the early reflected sound control signal in the same manner as described above and outputs the delay time to the speaker 51A. When there are a plurality of speakers, the matrix mixer 26 may be provided in the same manner as the sound signal processor 10 as described above. The matrix mixer 26 distributes and outputs the early reflected sound control signal to the plurality of speakers.

With this configuration and method, the sound signal processor 10F can generate an early reflected sound control signal for the mixed signal obtained by mixing the plurality of line inputted sound signals and can realize a desired sound field having a richer sound image and more spatial expansion than before.

(3-4) One embodiment according to the third embodiment of the present disclosure is a sound signal processing method including adjusting a balance between the level of the early reflected sound control signal and the level of a sound signal that is a source of the early reflected sound control signal.

Figure 18:
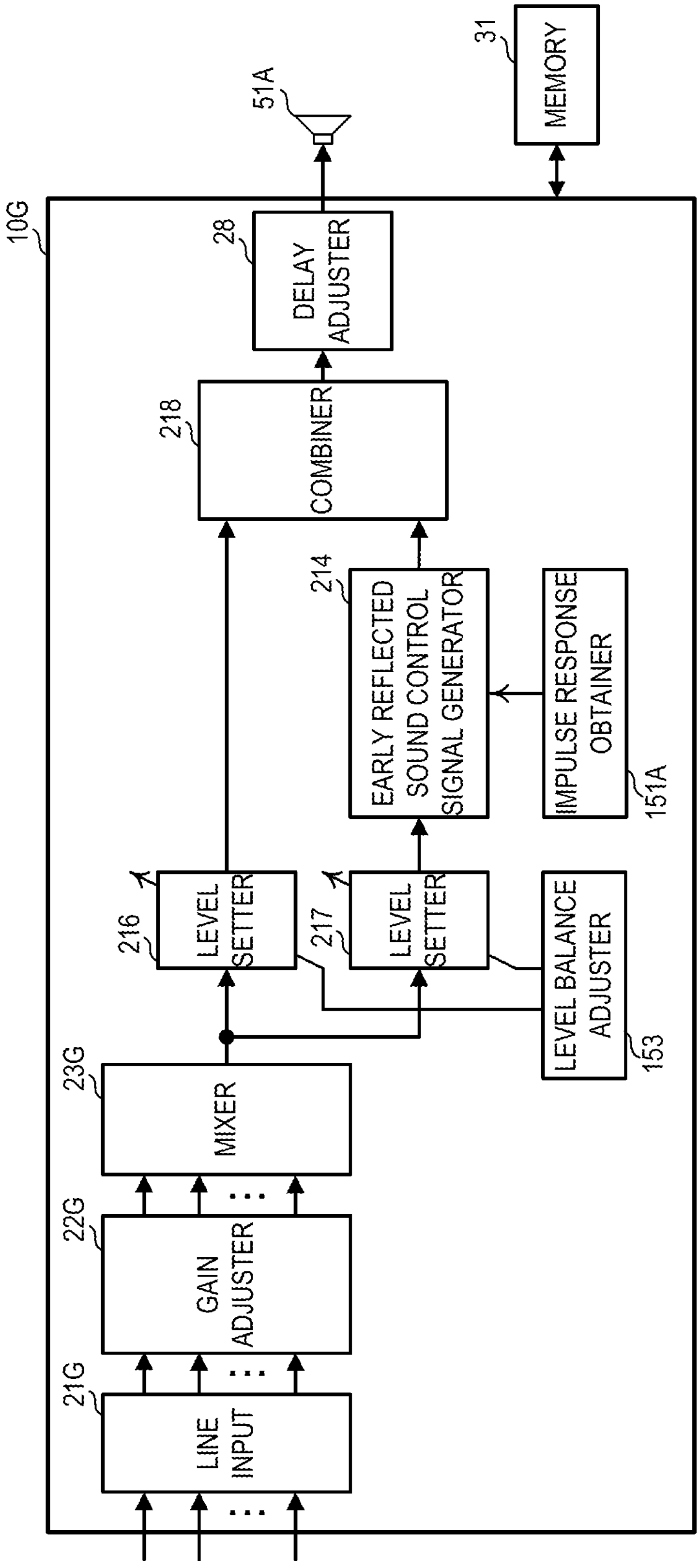
FIG. 18 is a block diagram showing the configuration of the sound signal processor.

FIG. 18 is a block diagram showing a configuration of a sound signal processor 10G corresponding to the sound signal processing method described above. The sound signal processor 10G includes a line input 21G, a gain adjuster 22G, a mixer 23G, the early reflected sound control signal generator 214, a level setter 216, a level setter 217, the impulse response obtainer 151A, a level balance adjuster 153, and the delay adjuster 28.

The line input 21G, the gain adjuster 22G, and the mixer 23G are the same as the line input 21F, the gain adjuster 22F, and the mixer 23F, respectively. The mixer 23G outputs a mixed signal to the level setter 216 and the level setter 217.

The level balance adjuster 153 sets a gain for a direct sound and a gain for an early reflected sound by using the level balance between the direct sound and the early reflected sound. The level balance adjuster 153 outputs the gain for the direct sound to the level setter 216 and outputs the gain for the early reflected sound to the level setter 217.

The level setter 216 controls the volume of the mixed signal by using the gain for the direct sound. The level setter 216 outputs, to a combiner 218, the mixed signal subjected to the volume control by the gain for the direct sound.

The level setter 217 controls the volume of the mixed signal by using the gain for the early reflected sound. The mixed signal subjected to the volume control by the gain for the early reflected sound is output to the early reflected sound control signal generator 214.

The early reflected sound control signal generator 214 convolves an impulse response for the early reflected sound into the mixed signal subjected to the volume control by the gain for the early reflected sound to generate an early reflected sound control signal the early reflected sound control signal generator 214 outputs the early reflected sound control signal to the combiner 218.

The combiner 218 combines the direct sound signal and the early reflected sound control signal and outputs the combined signal to the delay adjuster 28. The delay adjuster 28 adjusts the delay time of the combined signal in the same manner as described above and outputs the delay time to the speaker 51A. When there are a plurality of speakers, the matrix mixer 26, instead of the combiner 218, may be provided as in the sound signal processor 10 described above. The matrix mixer 26 distributes and outputs the combined signal of the direct sound signal and the early reflected sound control signal to the plurality of speakers. A matrix mixer 26 sets the allocation of the direct sound signal and the early reflected sound control signal for each speaker and distributes and outputs the direct sound signal and the early reflected sound control signal to the plurality of speakers by using the allocation.

With this configuration and method, the sound signal processor 10G can adjust the level balance between the direct sound signal and the early reflected sound control signal. Therefore, the sound signal processor 10G can realize a desired sound field having a rich sound image and spatial expansion, which is excellent in balance between the direct sound and the early reflected sound.

(3-5) One embodiment according to the third embodiment of the present disclosure is a sound signal processing method including generating a reverberant sound signal using the line-inputted sound signal having the controlled volume.

Figure 19:
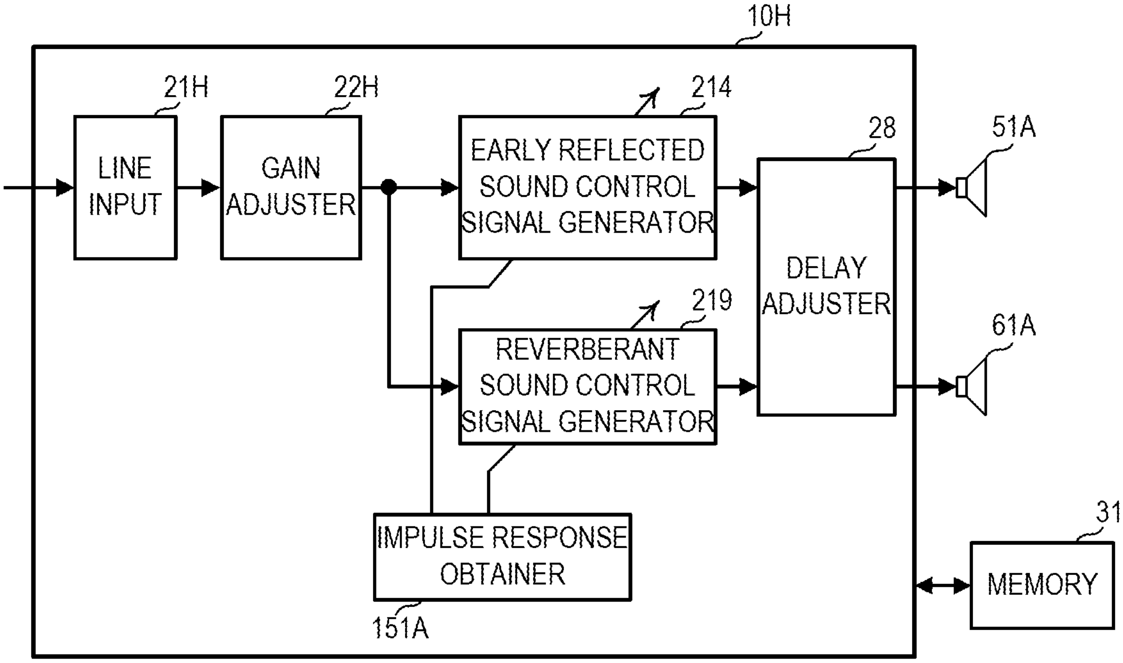
FIG. 19 is a block diagram showing the configuration of the sound signal processor.

FIG. 19 is a block diagram showing a configuration of a sound signal processor 10H corresponding to the sound signal processing method described above. The sound signal processor 10H includes a line input 21H, a gain adjuster 22H, the early reflected sound control signal generator 214, a reverberant sound control signal generator 219, the impulse response obtainer 151A, and the delay adjuster 28.

The line input 21H and the gain adjuster 22H are the same as the line input 21E and the gain adjuster 22E, respectively. The gain adjuster 22H outputs the line inputted sound signal subjected to the volume control to the early reflected sound control signal generator 214 and the reverberant sound control signal generator 219. The early reflected sound control signal generator 214 has the same configuration as the configuration described above.

The reverberant sound control signal generator 219 convolves an impulse response for the reverberant sound into the line inputted sound signal subjected to the volume control to generate a reverberant sound control signal. The reverberant sound control signal generator 219 outputs the reverberant sound control signal to the delay adjuster 28. The delay adjuster 28 adjusts the delay time of the reverberant sound control signal in the same manner as described above and outputs the delay time to the speaker 61A. When there are a plurality of speakers, the matrix mixer 26 may be provided in the same manner as the sound signal processor 10 as described above. The matrix mixer 26 distributes and outputs the reverberant sound control signal to the plurality of speakers.

With this configuration and method, the sound signal processor 10E can appropriately generate a reverberant sound control signal together with an early reflected sound control signal and can reproduce a desired sound field having a richer sound image and more spatial expansion.

(3-6) One embodiment according to the third embodiment of the present disclosure is a sound signal processing method including: collecting an output sound including the line-inputted sound signal having the controlled volume; and generating a reverberant sound signal using the collected sound signal corresponding to the collected output sound and the line-inputted sound signal having the controlled volume. That is, the sound signal processor collects and feeds back the sound output from the speaker and generates a reverberant sound signal from the collected sound signal.

With this configuration and method, the sound signal processor can generate a reverberant sound signal corresponding to the room 62B at the time of performance and can realize a desired sound field having a richer sound image and more spatial expansion.

(3-7) One embodiment according to the third embodiment of the present disclosure is a sound signal processing method including performing volume control for a reverberant sound on the reverberant sound signal immediately before or after the generation of the reverberant sound signal.

With this configuration and method, the sound signal processor can appropriately adjust the level of the reverberant sound. Thus, for example, the sound signal processor can appropriately adjust the level balance between the early reflected sound and the reverberant sound and the level balance between the direct sound and the reverberant sound.

(3-8) One embodiment according to the third embodiment of the present disclosure is a sound signal processing method including performing volume control for an early reflected sound on the early reflected sound control signal immediately before or after the generation of the early reflected sound control signal.

With this configuration and method, the sound signal processor can appropriately adjust the level of the early reflected sound. Thus, for example, the sound signal processor can appropriately adjust the level balance between the early reflected sound and the reverberant sound and the level balance between the direct sound and the early reflected sound.

(3-9) One embodiment according to the third embodiment of the present disclosure is a sound signal processing method including outputting the line-inputted sound signal having the controlled volume and the early reflected sound control signal together.

With this configuration and method, the sound signal processor can output the direct sound and the early reflected sound in the same (single) output route.

The description of the present embodiment is illustrative in all respects and not restrictive. The scope of the present disclosure is indicated by the claims, not by the embodiments described above. Furthermore, it is intended that the scope of the present disclosure includes all modifications within the meaning and scope of the claims.

What is claimed is:

1. A sound signal processing method comprising:

obtaining a plurality of sound signals respectively collected by a plurality of microphones arranged in a space;

adjusting respective levels of the plurality of sound signals in accordance with respective positions of the plurality of microphones;

mixing the plurality of sound signals having the adjusted respective levels to thereby obtain a mixed signal; and generating a reflected sound by using the obtained mixed signal.

2. The sound signal processing method according to claim 1, wherein adjusting the respective levels of the plurality of sound signals includes adjusting each of the respective levels of the plurality of sound signals in accordance with a distance from each of the respective positions of the plurality of microphones to a speaker that outputs the reflected sound.

3. The sound signal processing method according to claim 2, wherein each of the respective levels of the plurality of sound signals are adjusted by setting a gain for each of the plurality of sound signals to be higher in ascending order of the distance from each of the respective positions of the plurality of microphones to the speaker that outputs the reflected sound.

4. The sound signal processing method according to claim 1, further comprising adjusting a delay time of the reflected sound in accordance with a distance from each of the respective positions of the plurality of microphones to a speaker that outputs the reflected sound.

5. The sound signal processing method according to claim 4, wherein adjusting the delay time of the reflected sound includes setting the delay time to increase as the distance from each of the respective positions of the plurality of microphones to the speaker that outputs the reflected sound increases.

6. The sound signal processing method according to claim 1, further comprising outputting, via a speaker, the reflected sound, wherein the speaker that outputs the reflected sound includes:

a first speaker group of a first route, and a second speaker group of a second route, the respective levels of each of the plurality of sound signals are adjusted for each of the first route and the second route, and the mixing is performed for each of the first route and the second route.

7. The sound signal processing method according to claim 6, wherein the plurality of microphones are distinguished into a plurality of first microphones corresponding to the first speaker group and a plurality of second microphones corresponding to the second speaker group.

8. The sound signal processing method according to claim 1, wherein the reflected sound includes an early reflected sound.

9. A sound signal processing device comprising:

an obtainer that obtains a plurality of sound signals respectively collected by a plurality of microphones arranged in a space;

a gain adjuster that adjusts respective levels of the plurality of sound signals in accordance with respective positions of the plurality of microphones;

a mixer that mixes the plurality of sound signals having the adjusted respective levels to thereby obtain a mixed signal; and a reflected sound generator that generates a reflected sound by using the obtained mixed signal.

10. The sound signal processing device according to claim 9, wherein the gain adjuster adjusts the respective levels of the plurality of sound signals by adjusting each of the respective levels of the plurality of sound signals in accordance with a distance from each of the respective positions of the plurality of microphones to a speaker that outputs the reflected sound.

11. The sound signal processing device according to claim 10, wherein the gain adjuster adjusts each of the respective levels of the plurality of sound signals by setting a gain for each of the plurality of sound signals to be higher in ascending order of the distance from each of the respective positions of the plurality of microphones to the speaker that outputs the reflected sound.

12. The sound signal processing device according to claim 9, further comprising a delay adjuster that adjusts a delay time of the reflected sound in accordance with a distance from each of the respective positions of the plurality of microphones to a speaker that outputs the reflected sound.

13. The sound signal processing device according to claim 12, wherein the delay adjuster adjusts the delay time of the reflected sound by setting the delay time to increase as the distance from each of the respective positions of the plurality of microphones to the speaker that outputs the reflected sound increases.

14. The sound signal processing device according to claim 9, further comprising a speaker that outputs the reflected sound, wherein the speaker that outputs the reflected sound includes:

a first speaker group of a first route, and a second speaker group of a second route, the gain adjuster adjusts the respective levels of each of the sound signals for each of the first route and the second route, and the mixer performs the mixing for each of the first route and the second route.

15. The sound signal processing device according to claim 14, wherein the plurality of microphones are distinguished into a plurality of first microphones corresponding to the first speaker group and a plurality of second microphones corresponding to the second speaker group.

* * * * *